United States Patent [19]

Muramatsu et al.

[11] Patent Number: 5,410,419
[45] Date of Patent: Apr. 25, 1995

[54] FACSIMILE MACHINE CAPABLE OF DISTINGUISHING COPIED IMAGE AND RECEIVED IMAGE

[75] Inventors: Hideo Muramatsu, Shinshiro; Masamichi Sugiura, Toyokawa; Munehiro Nakatani, Toyohashi; Akio Nakajima, Toyokawa; Yoshikazu Ikenoue, Toyohashi; Shigenobu Fukushima, Yokohama; Keiji Nakatani, Toyokawa; Yoshiyuki Kurahashi, Aichi; Masanori Yamamoto, Toyokawa, all of Japan

[73] Assignee: Minolta Camera Kabushiki Kaisha, Osaka, Japan

[21] Appl. No.: 75,272

[22] Filed: Jun. 10, 1993

[30] Foreign Application Priority Data

Jun. 11, 1992 [JP] Japan .................. 4-151699
Jun. 11, 1992 [JP] Japan .................. 4-151704
Jun. 11, 1992 [JP] Japan .................. 4-151705

[51] Int. Cl.⁶ .......................... H04N 1/32; H04N 1/04
[52] U.S. Cl. ...................... 358/468; 358/475; 358/477; 358/488
[58] Field of Search ............. 358/400, 401, 403, 406, 358/468, 474, 475, 476, 477, 488, 496, 498; 271/65, 186

[56] References Cited

U.S. PATENT DOCUMENTS

| 4,992,884 | 2/1991 | Sakata ................... 358/401 |
| 5,055,946 | 10/1991 | Kurahashi et al. ........ 358/498 |
| 5,084,770 | 1/1992 | Nakayama ............... 358/403 |
| 5,173,785 | 12/1992 | Muramatsu .............. 358/400 |
| 5,177,620 | 1/1993 | Fukushima ............... 358/404 |
| 5,215,298 | 6/1993 | Stemmle et al. ........... 271/65 |

FOREIGN PATENT DOCUMENTS

| 60-49901 | 11/1985 | Japan ............ G03G 15/00 |
| 63-205669 | 8/1988 | Japan ............ G03G 15/00 |

OTHER PUBLICATIONS

"Hard Roller Fuser" *Zerox Disclosure Journal*, vol. 1, No. 6, Jun. 1976.

*Primary Examiner*—Stephen Brinich
*Assistant Examiner*—Jerome Grant, II
*Attorney, Agent, or Firm*—Willian Brinks Hofer Gilson & Lione

[57] ABSTRACT

The facsimile machine according to the invention can set a so-called night time collective time designation mode for power saving during night time processing time. Turning on a prescribed operation key of the facsimile machine permits printing. More specifically, even when the machine is in the power saving state, a printing operation is permitted in response to a key input.

17 Claims, 31 Drawing Sheets

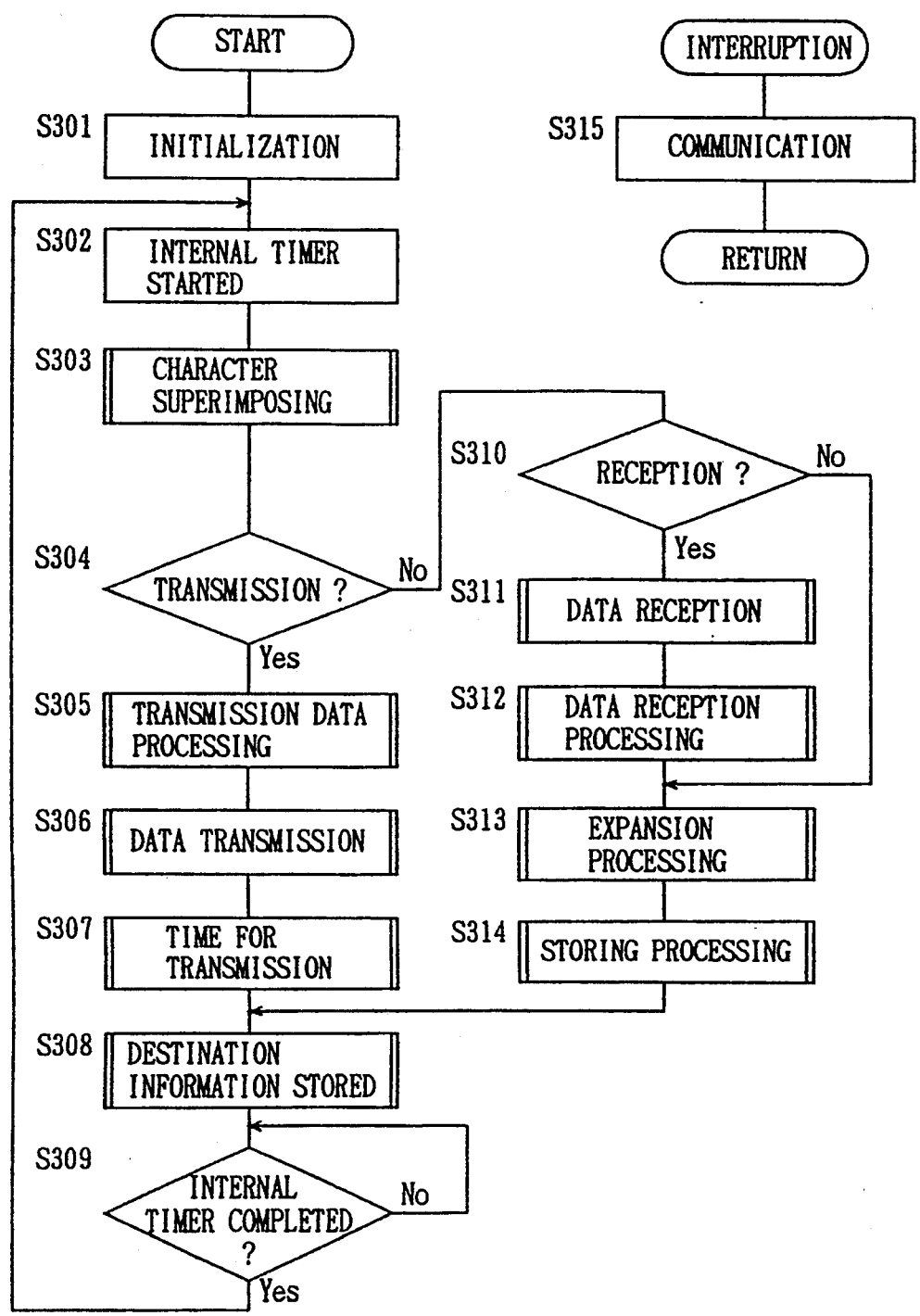

COPIED ORIGINAL

COPY RESULT
PRINT INFORMATION }
DUPLEX MARK

PRINTED

RECEIVED IMAGE

COPY RESULT
PRINT INFORMATION
RECEPTION PRINTING }
FAX MARK

PRINTED

FIG. 17

| WHITE RUN LENGTH | CODED WORD | BLACK RUN LENGTH | CODED WORD |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |
| 18 | 0100111 | 18 | 0000001000 |
| 19 | 0001100 | 19 | 00001100111 |
| 20 | 0001000 | 20 | 00001101000 |
| 21 | 0010111 | 21 | 00001101100 |
| 22 | 0000011 | 22 | 00000110111 |
| 23 | 0000100 | 23 | 00000101000 |
| 24 | 0101000 | 24 | 00000010111 |
| 25 | 0101011 | 25 | 00000011000 |
| 26 | 0010011 | 26 | 000011001010 |
| 27 | 0100100 | 27 | 000011001011 |
| 28 | 0011000 | 28 | 000011001100 |
| 29 | 00000010 | 29 | 000011001101 |
| 30 | 00000011 | 30 | 000001101000 |
| 31 | 00011010 | 31 | 000001101001 |
| 32 | 00011011 | 32 | 000001101010 |
| 33 | 00010010 | 33 | 000001101011 |
| 34 | 00010011 | 34 | 000011010010 |
| 35 | 00010100 | 35 | 000011010011 |
| 36 | 00010101 | 36 | 000011010100 |
| 37 | 00010110 | 37 | 000011010101 |
| 38 | 00010111 | 38 | 000011010110 |
| 39 | 00101000 | 39 | 000011010111 |
| 40 | 00101001 | 40 | 000001101100 |
| 41 | 00101010 | 41 | 000001101101 |
| 42 | 00101011 | 42 | 000011011010 |
| 43 | 00101100 | 43 | 000011011011 |
| 44 | 00101101 | 44 | 000001010100 |
| 45 | 00000100 | 45 | 000001010101 |
| 46 | 00000101 | 46 | 000001010110 |
| 47 | 00001010 | 47 | 000001010111 |
| 48 | 00001011 | 48 | 000001100100 |
| 49 | 01010010 | 49 | 000001100101 |
| 50 | 01010011 | 50 | 000001010010 |
| 51 | 01010100 | 51 | 000001010011 |
| 52 | 01010101 | 52 | 000000100100 |
| 53 | 00100100 | 53 | 000000110111 |
| 54 | 00100101 | 54 | 000000111000 |
| 55 | 01011000 | 55 | 000000100111 |
| 56 | 01011001 | 56 | 000000101000 |
| 57 | 01011010 | 57 | 000001011000 |
| 58 | 01011011 | 58 | 000001011001 |
| 59 | 01001010 | 59 | 000000101011 |
| 60 | 01001011 | 60 | 000000101100 |
| 61 | 00110010 | 61 | 000001011010 |
| 62 | 00110011 | 62 | 000001100110 |
| 63 | 00110100 | 63 | 000001100111 |

… 
FACSIMILE MACHINE CAPABLE OF DISTINGUISHING COPIED IMAGE AND RECEIVED IMAGE

BACKGROUND OF THE INVENTION

1. Field of the Invention

The present invention relates generally to image forming apparatuses having a facsimile function which enables printing of an image received by communication, and more specifically, to an image forming apparatus which is easy to use. Description of the Background Art An image forming apparatus which functions both as a copying machine and a facsimile machine of interest relevant to the present invention is disclosed, for example, in U.S. Pat. No. 5,173,785. According to this patent, the position from which a copied sheet of paper is discharged and the position from which a sheet of paper with the content of facsimile reception formed thereon is discharged are different.

Usually in a facsimile machine, for a received image, the indication thereof is attached to an end of paper.

In a conventional image forming apparatus having a copying function and a facsimile receiving function, in order to identify a paper sheet on which an image is output, the paper discharge position for example, should be changed or a description for facsimile reception should be conducted.

As a result, an excess space on a paper sheet is necessary for distinguishing a copied image from an image by facsimile reception, facsimile reception information should be reduced or divided if the information is printed out on a cut sheet of paper for performing a transmission source printing (printing an indication identifying a transmission side) in facsimile reception.

If an operator is not present by the side of a facsimile machine at night, a so-called night time collective processing by which a memory reception is performed in a prescribed designated time period.

This is performed, because jamming of paper, paper shortage, etc. are encountered if data is received and output without an operator during such a night time. Besides, it is not preferable to keep always the apparatus in a print enable state for power saving sake.

In a conventional night time collective processing, starting time and ending time are set, and the state of the apparatus is switched at the designated time everyday. Therefore, if a person is present at the time of the night time collective processing designated time, a night time collective processing mode set for power saving must be canceled if he/she desires to look at a received image. After the canceling, the operator should return the apparatus to the original state.

In a facsimile machine, the power supply is usually kept ON to maintain the state possible to cope with reception at all hours of the day. Although facsimile machines of electronic photography type utilizing regular paper have been developed in recent years, it still requires large electric power to maintain the state permitting immediate output in an awaiting time period.

SUMMARY OF THE INVENTION

It is therefore an object of the invention to achieve distinguishing a copied image from a facsimile reception image more easily without requiring any excess space in a facsimile machine having a copying function.

Another object of the invention is to permit printing of received information on the reception side without reduction and paper sheet dividing in a facsimile machine.

Yet another object of the invention is to temporarily cancel the paper saving state of an apparatus with a simple operation in a facsimile machine.

A still further object of the invention is to permit power saving corresponding to an operation mode in a facsimile machine.

The above-described objects of the invention are achieved in a facsimile machine having a copying function by discharging paper on which an image read by a scanner is copied and paper on which a received image is formed in different states utilizing one paper discharge holder.

A copied paper sheet and a paper sheet on which a received image is formed are discharged in different states to the same paper discharge holder. As a result, the copied image and the facsimile reception image are easily distinguished from each other without requiring any excess space of the paper discharge holder in a facsimile machine having a copying function.

In another aspect of the invention, a facsimile machine stores reception images in a memory in a prescribed time period, and then prints out the stored image data after a prescribed time period elapses. During the prescribed time period, the facsimile machine is set to a power saving mode in which printing out is not performed. Meanwhile, even during the prescribed time period, if an original is set at the original plate, image data is printed out based on the image data stored in the memory.

Accordingly, a facsimile machine capable of temporarily canceling its power saving state by a simple operation can be provided.

The foregoing and other objects, features, aspects and advantages of the present invention will become more apparent from the following detailed description of the present invention when taken in conjunction with the accompanying drawings,

BRIEF DESCRIPTION OF THE DRAWINGS

FIG. 13 is a flow chart for use in illustration of an operation by a CPU for FAX;

FIG. 17 is a representation showing an example of coding format;

DESCRIPTION OF THE PREFERRED EMBODIMENTS

Now, one embodiment of the invention will be described in conjunction with the accompanying drawings.

Figure 1:
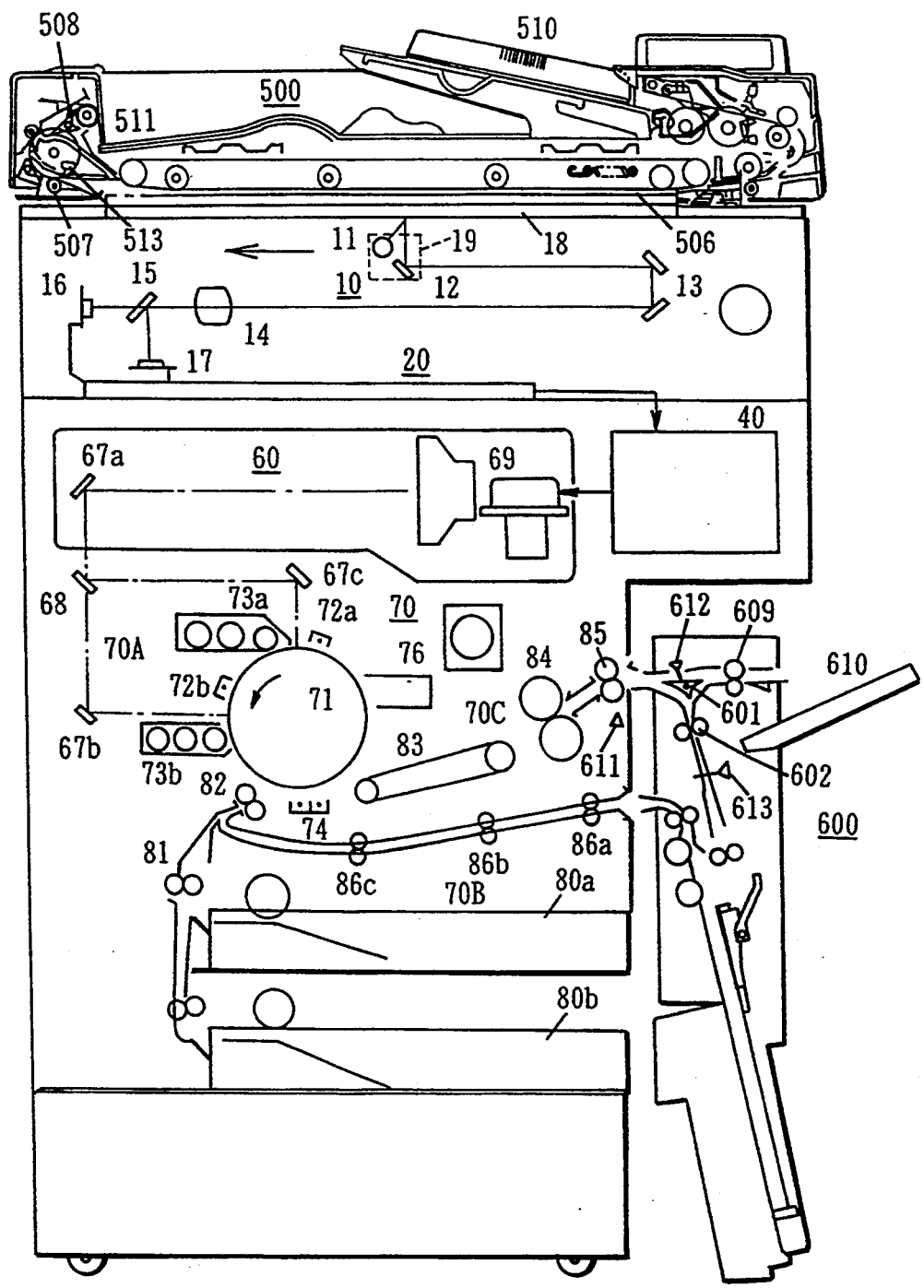
FIG. 1 is a view schematically showing a digital copying machine to which the invention is applied.
Figure 32:
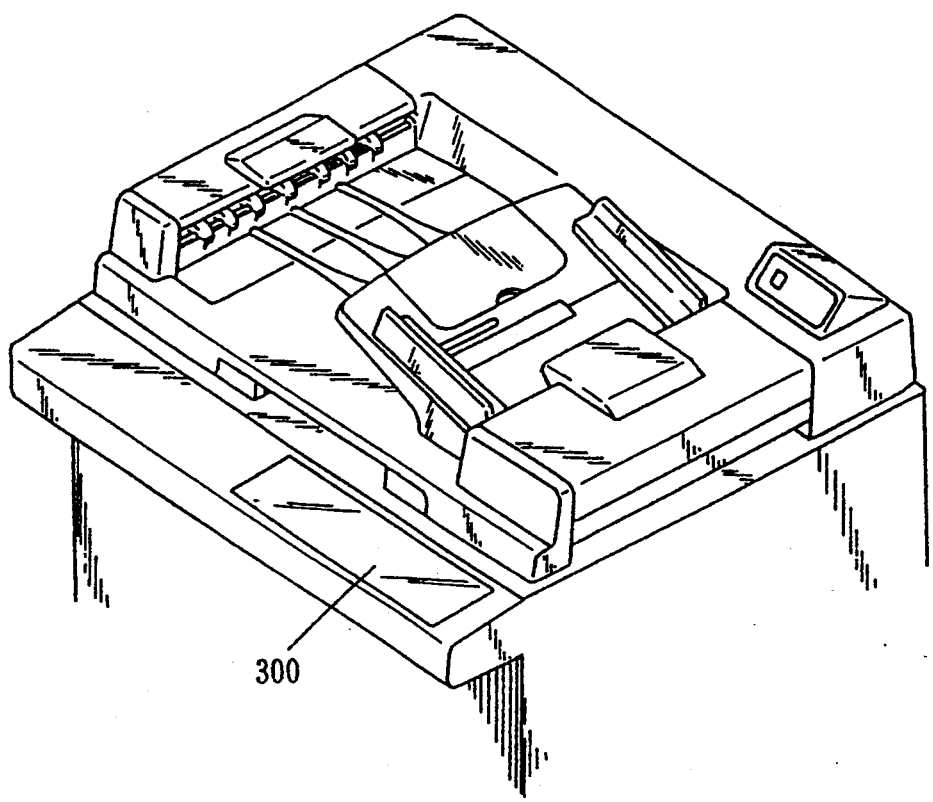
FIG. 32 is a perspective view showing a digital copying machine viewed diagonally from above.

Referring to FIGS. 1 and 32, a facsimile machine having a digital copying function includes a scanning system 10, an image signal processing portion 20, a printing processing portion 40, an optical system 60, an image forming system 70, an operation panel 300, an original conveying portion 500, and a paper re-feed portion 600.

The scanning system will be described first. Scanning system 10 scans an original placed on an original plate glass 18 by irradiating light, and extracts light reflected therefrom as an electrical signal utilizing a photoelectric conversion element. Such conversion into an electrical signal is performed by two photoelectric conversion elements for a specified color and the other colors.

Scanning system 10 includes an exposure lamp 11 for irradiating an original with light, mirrors 12, 13 for changing the optical path of light reflected from the original, a lens 14 for collecting the reflected light, a half mirror 15 for guiding the light into the two photoelectric conversion elements for color determination, and photoelectric conversion elements 16, 17 for generating an electrical signal in response to the received light. Scanner 19 moves in parallel to the original plate glass and scans the original as it moves in the direction indicated by the arrow in the figure by exposing the original to light.

Image signal processing portion 20 processes an image signal output from the two photoelectric conversion elements 16, 17, distinguishes a specified color from the other colors, and outputs the result to a printer 40 as image data with color information. Now, the structure and operation of the apparatus will be described by illustrating an original containing two colors, black and red. The same operation and structure apply to the case of an original containing two colors such as black and another color, or blue and red.

Printing processing portion 40 sends image data to two semiconductor lasers depending upon the image data with color information transmitted thereto. At the time, the image data is delayed by the amount of the distance between the two lasers and sent from the first laser to the second laser.

Figure 33:
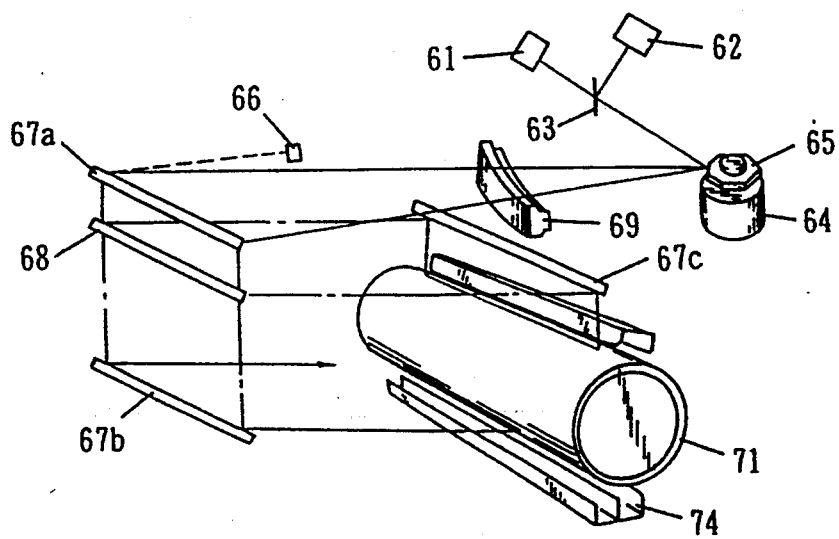
FIG. 33 is a view schematically showing the structure of an optical system, and an image forming system.

FIG. 33 is a view schematically showing the structure of optical system 60 and image forming system 70. Referring to FIGS. 1 and 33, optical system 60 has a function of forming an electrostatic latent image on a photoreceptor drum (hereinafter referred to as P/C drum) by a laser beam. Optical system 60 includes semiconductor lasers 61, 62, a collimator lens, a half mirror for combination 63, a polygon mirror 65, a lens 69, a mirror 67a, a mirror 68 for separating two laser beams, and mirrors 67b, 67c for guiding each beam onto P/C drum 71.

Semiconductor lasers 61, 62 separately generate laser beams modulated by image data output from printing processing portion 40, and the respective laser beams are combined by half mirror 63. The combined laser beam has its direction changed by polygon mirror 65 rotated by a polygon motor 64 to scan along the line on P/C drum 71. The deflected combined laser beam is collected by lens 69 to form an image on P/C drum 71, deflected by mirror 67a, and then separated into two laser beams by separation mirror 68 to reach P/C drum 71 by mirrors 67b and 67c in their respective optical paths.

Now, image forming system 70 will be described. Image forming system 70 which develops an electrostatic latent image formed on P/C drum 71 and transfers the image for fixation onto paper includes a development transfer system 70A and a conveying system 70B and a fixing system 70C.

Development transfer system 70A includes a P/C drum 71, a first corona charger 72a for evenly charging the surface of P/C drum 71, a developer 73a for accommodating red toner, a second corona charger 72b for once again charging P/C drum 71 for a second exposure, a developer 73b for accommodating black toner, a transfer charger 74 for transferring a developed toner image onto paper, and a cleaning portion 76 for removing toner remaining on the surface of P/C drum 71.

Conveying system 70B supplies/conveys paper sheets for printing, and includes cassettes 80a, 80b for accommodating paper sheets, a paper guide 81 for guiding paper sheets extracted from cassettes 80a, 80b, timing rollers 82 for adjusting the timing of conveying paper to the transfer portion, and a belt 83 for conveying paper to fixing system 70C. Paper input from paper re-feed portion 600 is sent to timing rollers 82 through horizontal conveying rollers 86a, 86b, 86c.

Fixing system 70C thermally fixes a toner image transferred on a sheet of paper for printing between fixing rollers 84, and the toner-fixed paper sheet is discharged from the machine by discharge rollers 85.

Now, original conveying portion 500 will be described. Original conveying portion 500 automatically sets paper set on an original paper feed tray 510 to original plate glass 18 and discharges the paper to an original discharge portion 511 after reading. Original conveying portion 500 is so structured as to cope with a single mode printing only one side of an original and a duplex mode printing both sides of an original.

Referring back to FIG. 1, paper re-feed portion 600 will be described. Paper re-feed portion 600 accommodates and re-feeds paper so as to once again print the back surface or the printed surface of a paper sheet. If the back side of the printed paper will be printed, the duplex mode is set, and if the same surface is once again printed, a composite mode is set. For paper feeding in a normal mode other than the duplex and composite modes and paper re-feeding in the duplex or the composite mode, paper passes over a switching nail 601 and is discharged to discharge tray 610.

Figure 2:
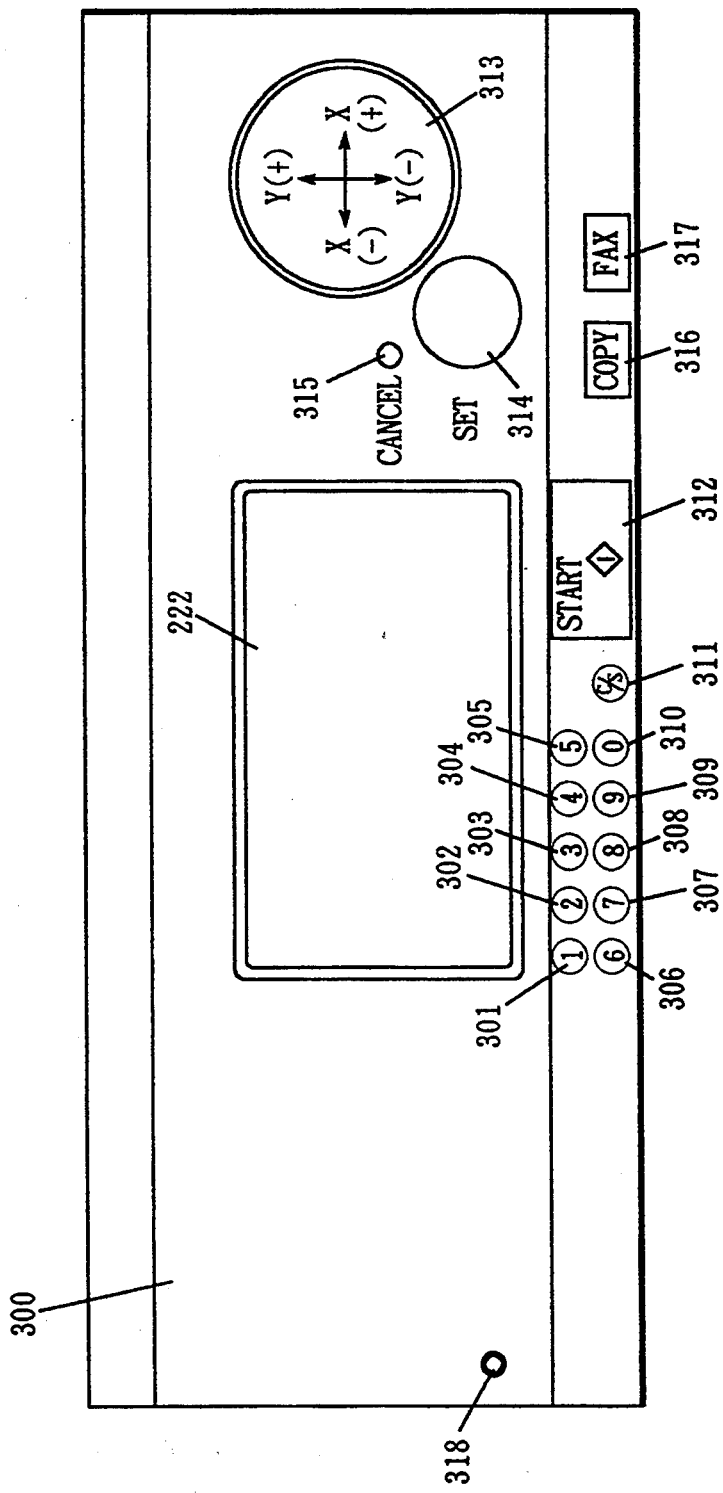
FIG. 2 is a plan view showing an operation panel in a copying machine.

Referring to FIG. 2, operation panel 300 in the facsimile machine will be described. Provided on the front side of operation panel 300 are a copy mode key 316 which is pressed to use the facsimile machine as a copier, an FAX mode key 317 which is pressed to use the apparatus as a facsimile, ten keys 301–310 to input the number of copies, telephone numbers, etc., a clear/stop key 311 for instructing cancellation of input and interruption of multi-copy, and a start key 312 for instructing a copying start and a transmission start. In the right part of operation panel 300, a joy ball 313 for selecting a copy mode menu, etc. a set key 314 for deciding the copy mode menu selected by joy ball 313, a cancel key 315 for canceling the content decided by set key 314, which is disposed close to joy ball 313 so that the cancel key can be pressed while operating joy ball 313. A liquid crystal display panel 222 of a matrix type (640×400 dots) displaying all the contents related to operation is disposed in the center of operation panel. In the left, an external light sensor 318 for detecting the brightness of the operation panel is disposed.

Figure 3:
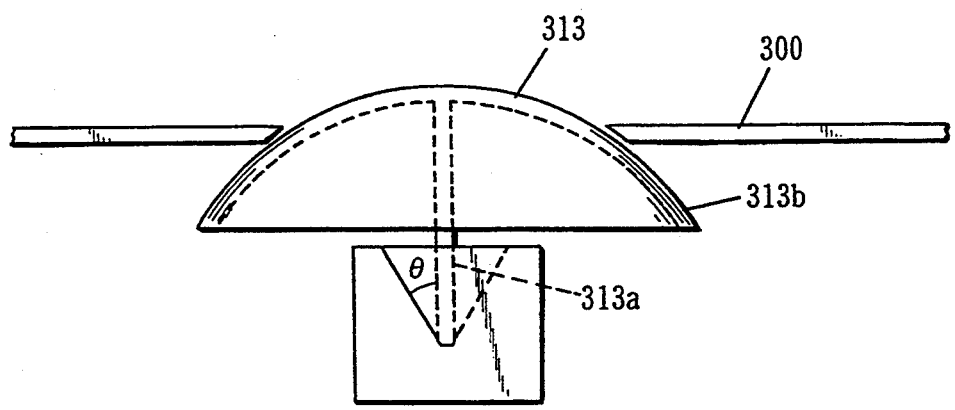
FIG. 3 is a side view schematically showing the vicinity of a joy ball.
Figure 4:
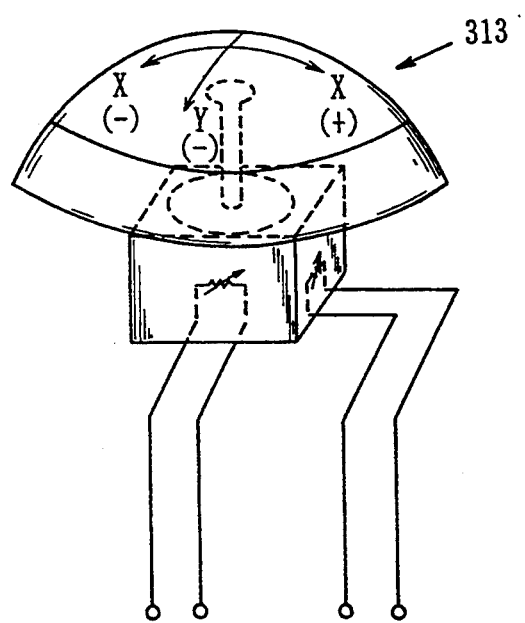
FIG. 4 is a perspective view showing a joy ball.

FIG. 3 is a side view schematically showing the vicinity of joy ball 313, while FIG. 4 is a perspective view showing joy ball 313.

Joy ball 313 includes a stick portion 313a which can be inclined only by a certain angle $\theta$ in any direction of $360\frac{1}{2}$, and a ball portion 313b constituting part of the ball attached to the upper part of stick portion 313a. Ball portion 313b has a part exposed from the exterior of operation panel 300, and when joy ball 313 is rotated, the part covered by the exterior of operation panel 300 will be exposed. It is noted that stick portion 313a automatically returns to its upright state ($\theta=30\frac{1}{2}$) by the function of a spring (not shown). The rotation angle of stick portion 313a in each of the X-direction and Y-direction is detected by two variable resistors (see FIG. 4), and converted into digital data by A/D conversion, and various controls are conducted based on the detected angle.

Figure 5:
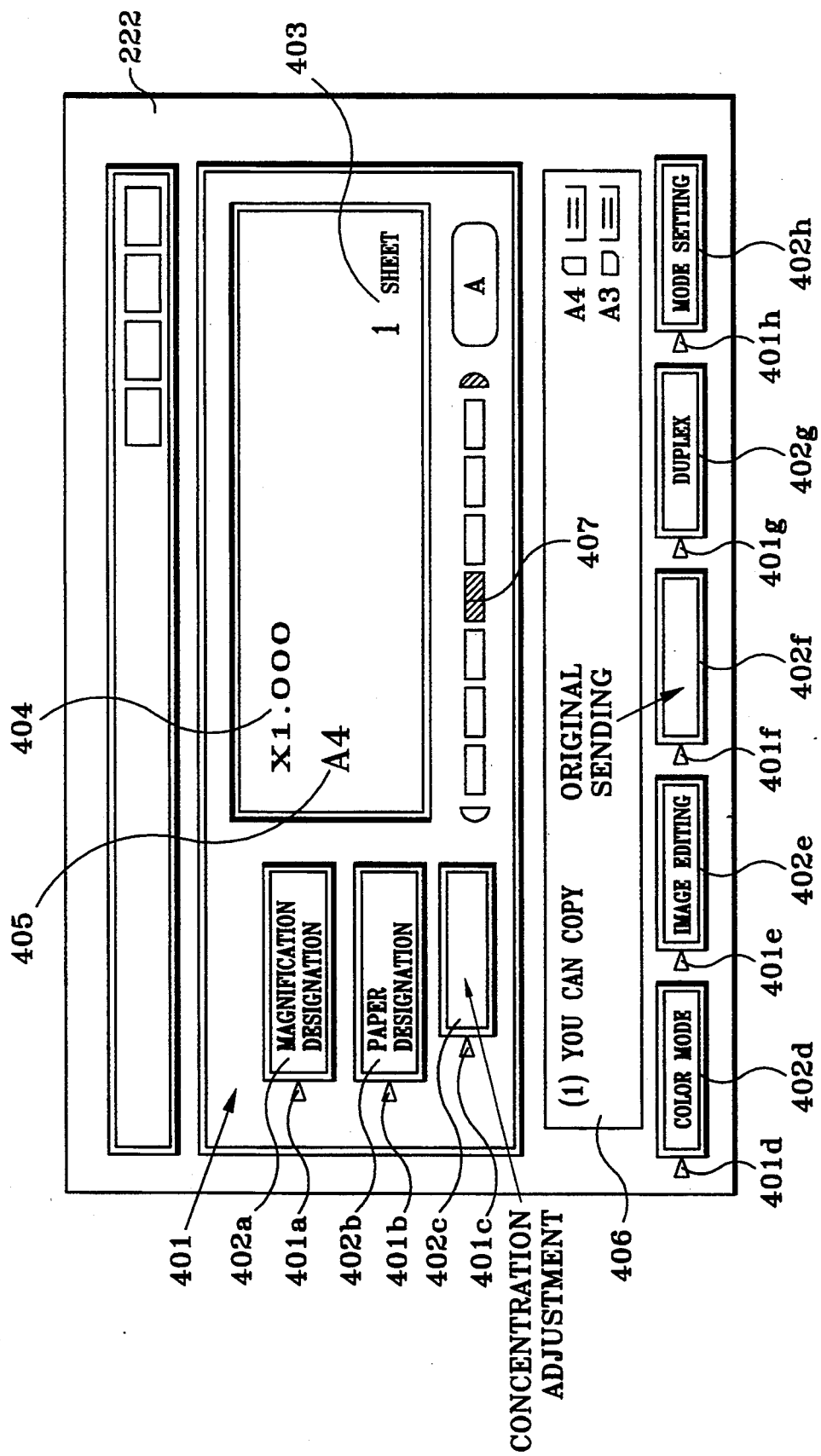
FIG. 5 is a view schematically showing a display content on a liquid crystal display panel.

FIG. 5 is a view schematically showing a display content on liquid crystal display panel 222 when the power supply is turned on and an operation as a copier is designated by copy mode key 316. In FIG. 5, the menu cursor is originally placed at a home position 401. Illuminated positions 401a–401h for the menu cursor are provided at the left ends of menus 402a–402h, respectively. When joy ball 313 is operated and an arbitrary menu is selected, one of positions 401a–401h corresponding to the selected menu is reversed in black. It is noted that in FIG. 5, the menu cursor is at the home position.

The number of copies set by ten keys 301–310 is displayed at a copy number display 403 with a number of 199, for example. A magnification decided by the function of "magnification designation" menu 402a is displayed at a copy magnification display 404, the size of paper in paper feed tray 50 selected by the function of "paper designation" menu 402b is displayed at copy paper size display 405. The state of the copying machine at the time and a processing to be performed to the copying machine are displayed at an information display 406 utilizing characters, pictographs, etc. A copy concentration selectively set by the function of "concentration adjustment" menu 402c is displayed at a copy concentration level display 407 in which seven stages of concentration levels which can be set manually and automatic setting are provided.

Figure 6:
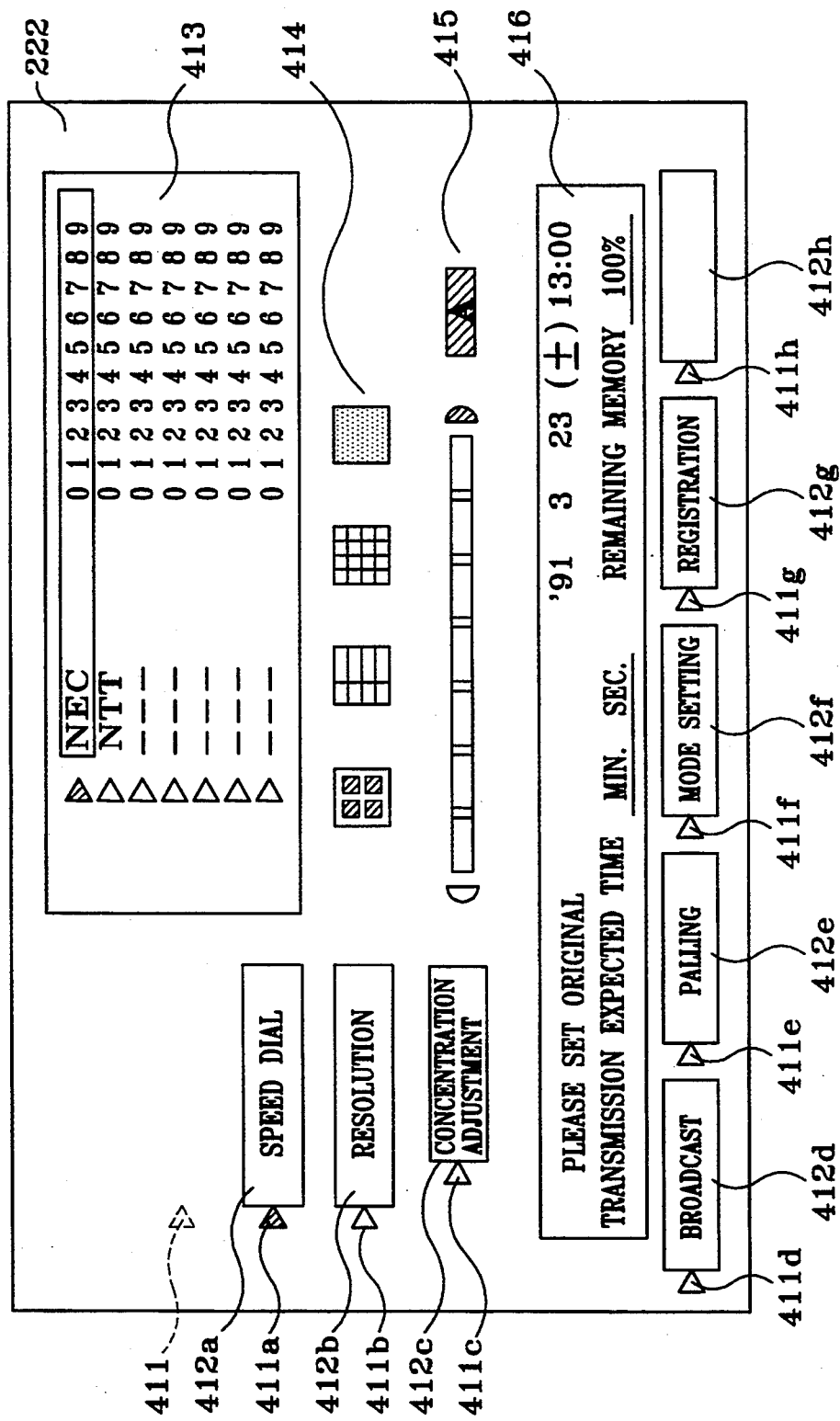
FIG. 6 is a view showing a display content on a liquid crystal display panel when an operation as a facsimile is designated.

FIG. 6 is a view schematically showing a display content on liquid crystal display panel 222, when an operation as a facsimile is designated by FAX mode key 317.

Although a menu different from that of the copy mode is displayed at the illuminated positions 412a–412h of the menu cursor, a method of selecting is the same.

Dial information is displayed at a dial information display area 413. A speed dial selects a speed dial menu (412a), and if a designation is selected by moving the menu cursor within dial information display area 413, the number of the destination is dialed.

Resolutions to be selected and selected states are displayed in an area 414 from left to right in the order standard fine, super fine, and intermediate. For the level indicating the concentration of a transmitted image, seven stages of levels which can be manually set and automatic setting are displayed at an area 415. Various messages are displayed at area 416, and an instruction of the next operation, the present date and time, and the remaining amount of the code memory are displayed. The value of transmission expected time is displayed when reading of all the originals is completed.

Selection of the speed dial menu and selection of a destination are both performed only by operating joy ball 313 and set key 314.

When the menu cursor is moved to 411a and set key 314 is turned on, the menu cursor in dial information area 413 is made movable by joy ball 313. When the rotating angle $\theta$ of the joy ball is within a range of certain angles, the movement of all the menus is proceeded at a speed corresponding to the angle, but in a certain range, only the head of each of, the Japanese syllabary is moved.

Destinations are registered by the speed dial menu in a registration mode 412g, and sorted in the order of the Japanese syllabary by internal processing for display in dial information area 413. Since the menu cursor thus moves, a destination can quickly selected only by adjusting the rotating amount of the joy ball, and the selection will not be so much troublesome even if the number of destinations to be registered is further increased.

Figure 7:
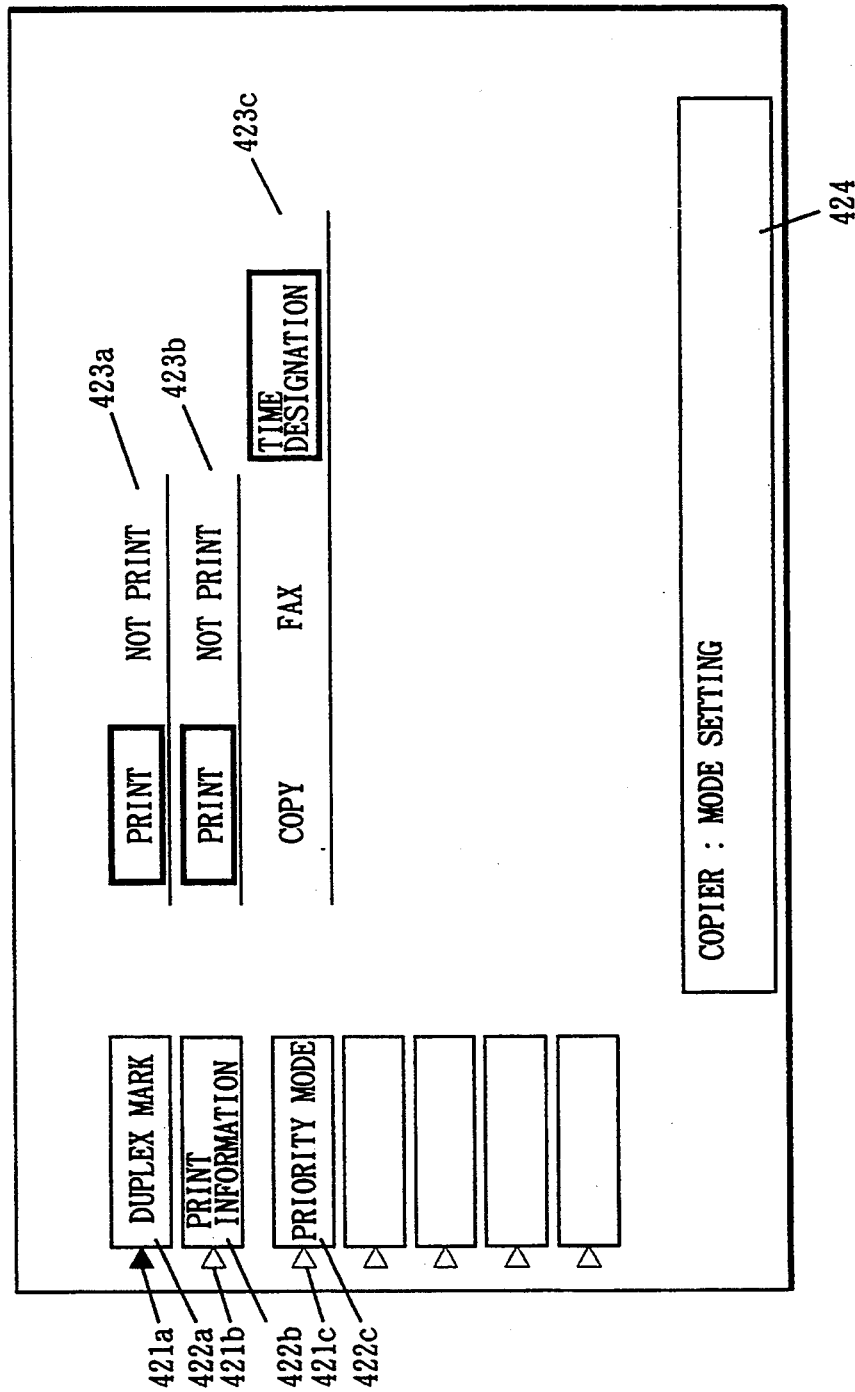
FIG. 7 is a view showing a display content on a liquid crystal panel in a copying mode.

FIG. 7 is a view showing a display content when a mode setting is selected in the copy mode. This content is displayed by rotating joy ball 313 to the lower side (Y (−)), then rightwards (X (+)), then moving the menu cursor to 401h, and turning on set key 314.

Menus 421–423 for duplex mark, print information and priority mode are displayed, and "PRINT" and "TIME" DESIGNATION are designated. In area 424, a message indicating the set state of the apparatus is displayed.

Figure 8:
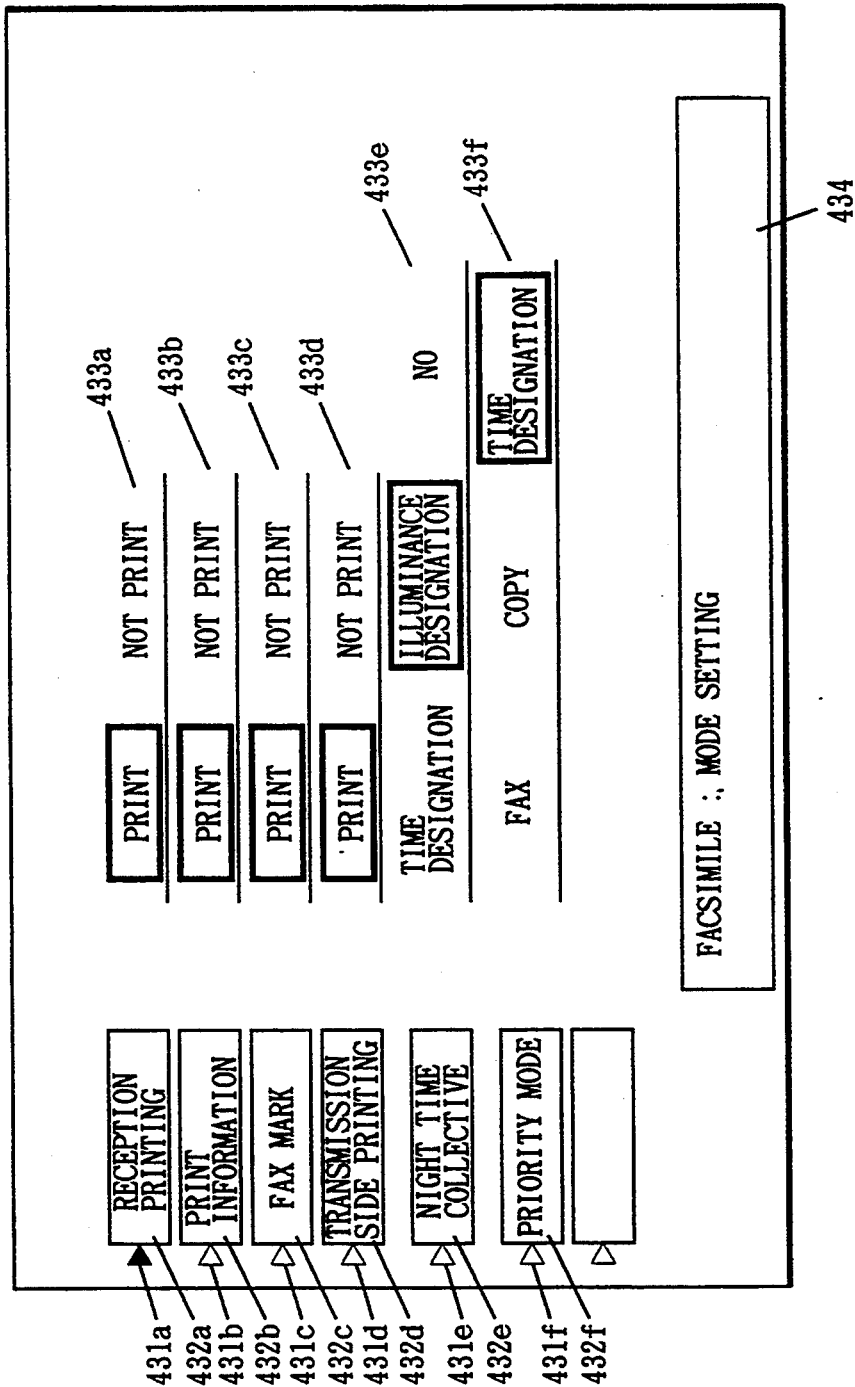
FIG. 8 is a view showing a display content on a liquid crystal display panel when a mode setting is selected in a facsimile mode.

FIG. 8 is a view showing a display content when a mode setting is selected in the facsimile mode.

Menus 431–433 corresponding to RECEPTION, PRINTING (indication of reception), PRINT INFORMATION, FAX MARK, TRANSMISSION SIDE PRINTING (indication identifying transmission side), NIGHT TIME COLLECTIVE, and PRIORITY MODE are displayed, and "print" is designated for each of the menus. As for the night time collective processing mode, ILLUMINANCE DESIGNATION 433e is selected. The priority mode can be set in the same manner as the copy mode, and "TIME DESIGNATION" 433f is selected.

Figure 9:
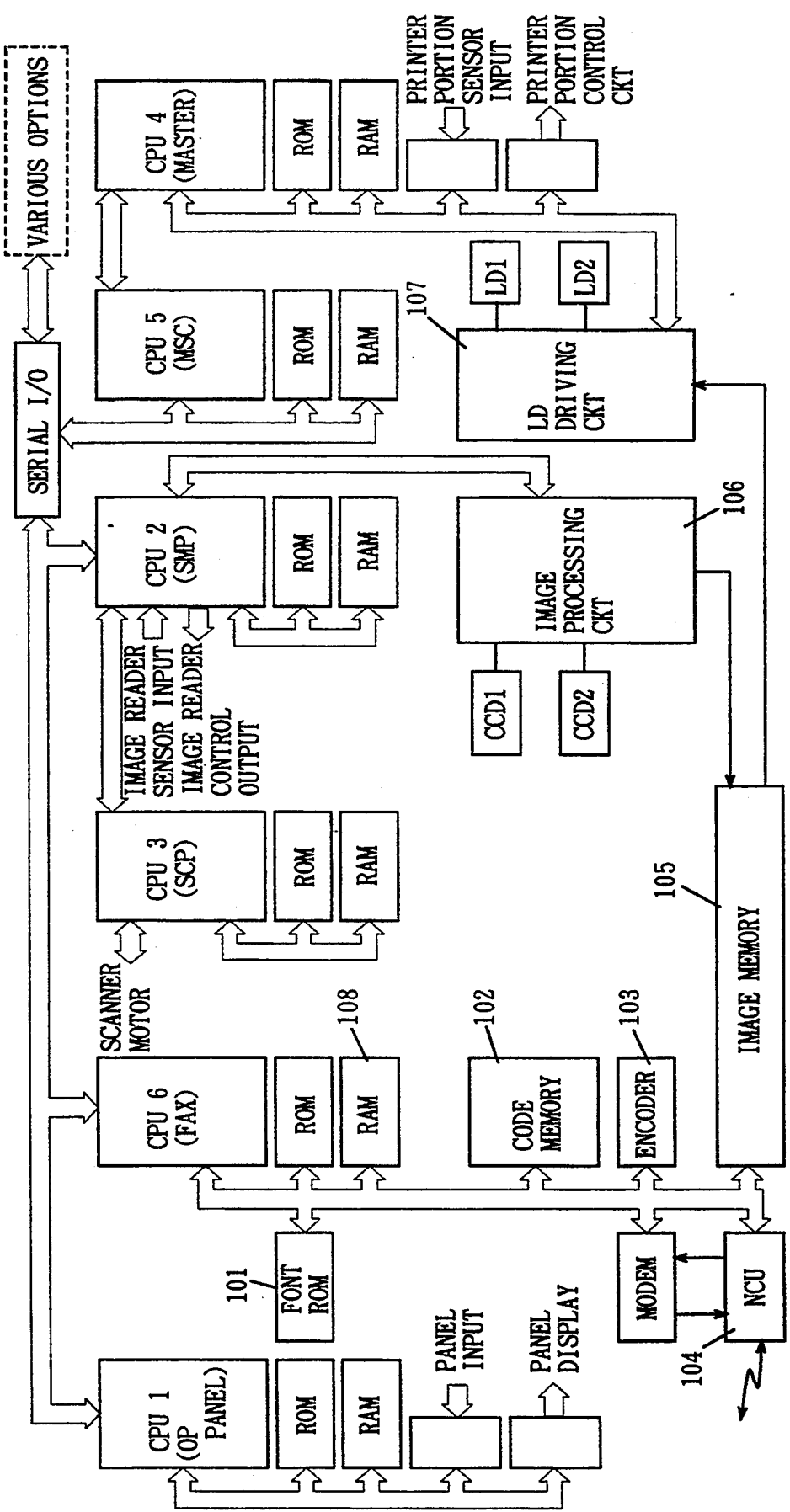
FIG. 9 is a block diagram showing a control circuit.

Now, referring to FIG. 9, a control circuit in a facsimile machine according to the invention will be described. FIG. 9 is a block diagram showing the control circuit which is mainly formed of eight CPUs.

CPU 1 analyses data in the form of a signal sent by switches and the ten key group on operation panel 300 or through communication, makes displays, and executes a processing such as transmitting the input data.

CPU 2 inputs image data from photoelectric conversion elements 16, 17, and performs usual image processing such as shading correction, magnification changing, and dither processing. CPU 2 further determines the color of the original, converts the result of the determination into a writing signal corresponding to color (red)/black toner development, and outputs the data to printing processing portion 40.

CPU 3 is a CPU controlling the operation of scanning system 10.

CPU 4 is a CPU controlling image forming system 70, and optical system 60, and executes first and second charging control of P/C drum 71, and control of printing-related operation such as writing of generated image data, development of color (red)/black toner in cooperation with printing processing portion 40.

CPU 5 controls the entire facsimile machine, adjusts mutual timings of components, and determines operation modes.

CPU 6 controls the facsimile portion, in other words the communication block, and performs exchange between image data and coded data, transmission/reception of communication protocol, and conversion of NCU portion.

Figure 10:
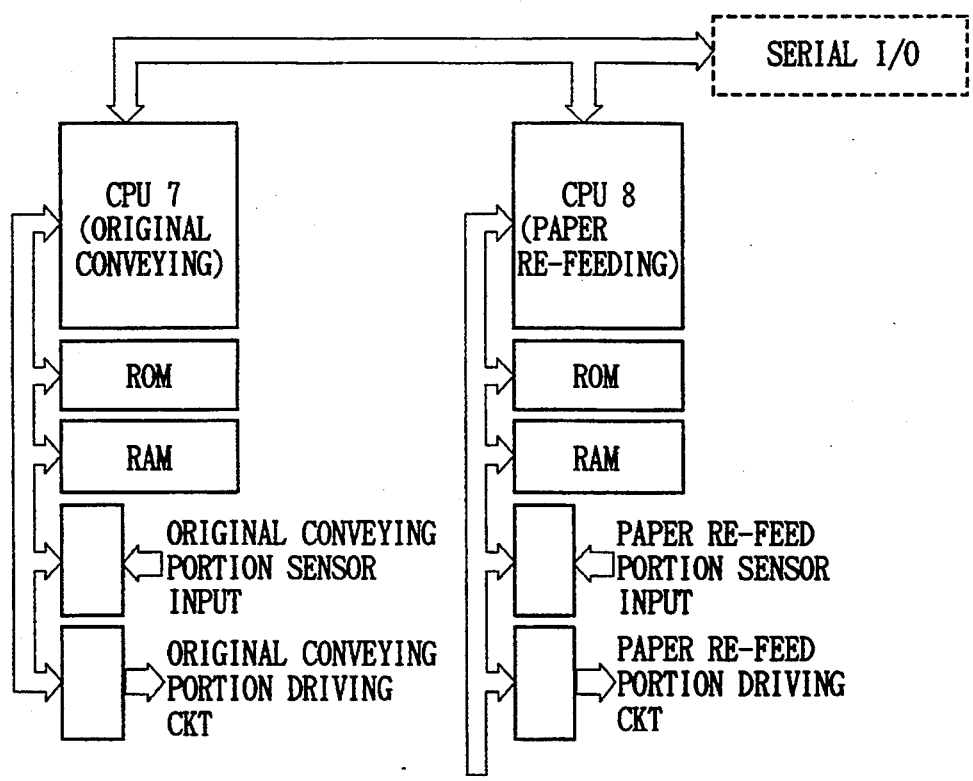
FIG. 10 is a block diagram showing a control circuit.

CPUs 7, 8 shown in FIG. 10 perform serial communication with CPU 5 as in the case of CPU 6, and perform control of original conveying and paper re-feeding, respectively.

Now, the operation of the CPUs will be described by referring to flow charts.

Figure 11A:
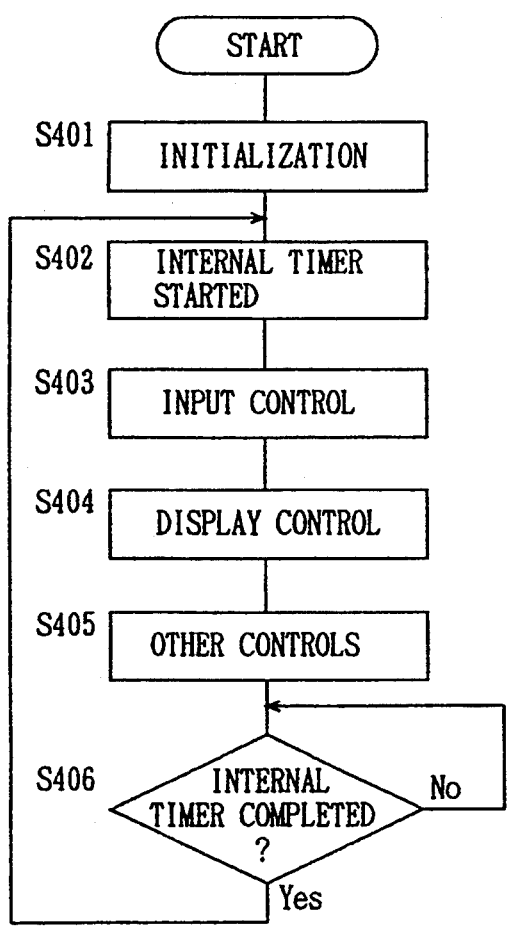
FIGS. 11(A–B) are flow charts for use in illustration of a main routine.
Figure 11B:
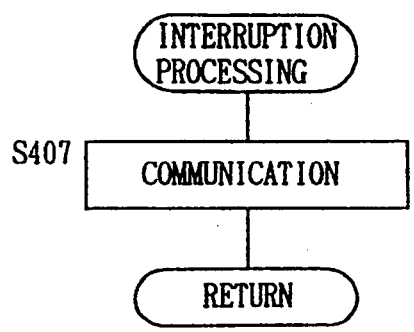

Referring to FIG. 11, the operation of CPU 1 will be described first. Input of switches and keys on operation panel 300, and a main routine such as display on the display portion are controlled by CPU 1.

An initialization is performed (S401), an internal timer is started (S402), and roughly speaking control of the operation modes such as a copy mode and a facsimile mode is performed in response to an input signal on operation panel 300 in input control S403. Then, these pieces of data are output to display portion 222, etc. on operation panel 300 in display control S404. If a trouble data on another CPU is received by a serial I/O, a display corresponding thereto is also performed in this routine.

Then, the other control (S405) is performed, and upon the completion of the internal timer (S406), the program returns to S402.

It is noted that CPU 1 performs communication control by an interruption processing (S407).

Now, the operation of CPU 4 will be described in conjunction with FIG. 12. CPU 4 controls development/transfer system 70A, conveying system 70B, and fixing system 70C.

An initialization is performed first, and control of development/transfer system 70A is performed when the internal timer is started (S700–S702). Now, control of development/transfer system 70A will be described.

While P/C drum 71 makes one rotation in the direction of the arrow, the steps are performed in the order charging → first exposure → first development → second charging → second exposure → second development → second ment transfer, whereby a copying operation in two colors is controlled. Then, the surface of P/C drum 71 is charged to a potential $V_{01}$ by corona charger 72a. A laser beam is irradiated for exposure to form a first latent image. The color toner is reversed for development by applying a biassing voltage by first developer 73a. Second corona charger 72b is utilized to bring uniformly the surface potential of P/C drum 71 to $V_{02}$. A laser beam is irradiated for the second time to form a second latent image. A biassing voltage is applied by second developer 73b to reverse the black toner for development. The resulting two-color toner image is transferred onto a sheet of paper utilizing transfer charger 74.

Then, control of conveying 70B is performed (S703). Herein, feeding of paper from cassettes 80a, 80b in which the paper sheets are accommodated, activation of timing rollers 82 for matching the tip end of the toner image and the tip end of paper sheet, conveying the paper sheet after the transfer to the fixing portion, etc. are executed.

Then, control of fixing system 70C is performed (S704). Herein, thermal fixation of the image transferred onto the paper sheet (two-color toner image), temperature control of fixing rollers 84, discharge after the fixation, etc. are performed.

Then, control of the printing processing portion is performed, and upon the completion of the internal timer after the other processings (S705–S707), the program returns to S701.

The operation of CPU 6 for fax will be described in conjunction with FIGS. 9, 13, and 14.

A transmission operation will be described first. When initialization, internal timer starting, character superimposing are completed (S301–S303), it is determined whether or not a transmission mode is set (S304). If it is determined that the transmission mode is set in S304, image data from an image reader portion is written in the image memory in response to input of a telephone number, a communication mode, etc. from operation panel 300, while converting the image data into code data utilizing an encoder, and the resultant data is written in a code memory 105 (S305). A prescribed destination is then dialed from NCU 104. Thereafter, the transmission operation is performed according to a prescribed protocol (S306, S307).

Now, a reception operation will be described. When an incoming signal from NCU 104 is detected (No in S304, Yes in S314), code data is written in a code memory 102 according to a prescribed ]protocol (S311). Then, the code data is read out from code memory 102, the read out data is converted into image data utilizing a decoder 103, and the resultant image data is written in image memory 105 (S312). The image data is further sent to an LD driving circuit 107 from image memory 1.05, and the received data is stored (S314).

Now, the structure of image memory 105 will be described. Image memory 105 has a capacity corresponding to dotted data for one page, in other words a capacity of A3 corresponding to 400 DPI, and includes a sign bit indicating a black line or red line for every line. The sign bit indicates 0 for black line, and 1 for color line. When data is read out from the memory and transferred to the printer, it is determined whether to store the data in black or red depending upon the sign bit. Alternatively, when the read image data is written, the sign bit indicating black or red is written together with the image data. In the copy mode, the image data passes through image memory 103 and is directly sent to the printer if no print information and duplex mark is superimposed.

Now, the character superimposing described in S303 will be described. In the following modes, development into image memory 105 is conducted by referring to characters or certain font data from a font ROM 101 shown in FIG. 9.

(i) Transmission side printing mode: the facsimile number of the transmission side, date and time, the number of pages, etc. are superimposed at the head of read original image data in the image memory during transmission.

(ii) Reception printing mode: after received image data is developed in the image memory, the facsimile number of transmitting party, date and time of reception, the number of pages, etc. are superimposed at the end of the developed data.

(iii) FAX mark model: a mark indicating that image data to be printed is a fax data is developed in red lines in the image memory at a portion corresponding to the back side of a printing surface of a paper sheet.

(iv) Duplex mark mode: a mark indicating a duplex copy is attached to an original read image on the image memory in red lines so that when printed in a duplex copy mode, the mark on the surface will call the user's attention to the back surface for printing.

(v) Print information mode: explicit indication whether the data is output from a copy or an FAX received image, the output date and time, etc. are added to an original read image on image memory 105.

Figure 14:
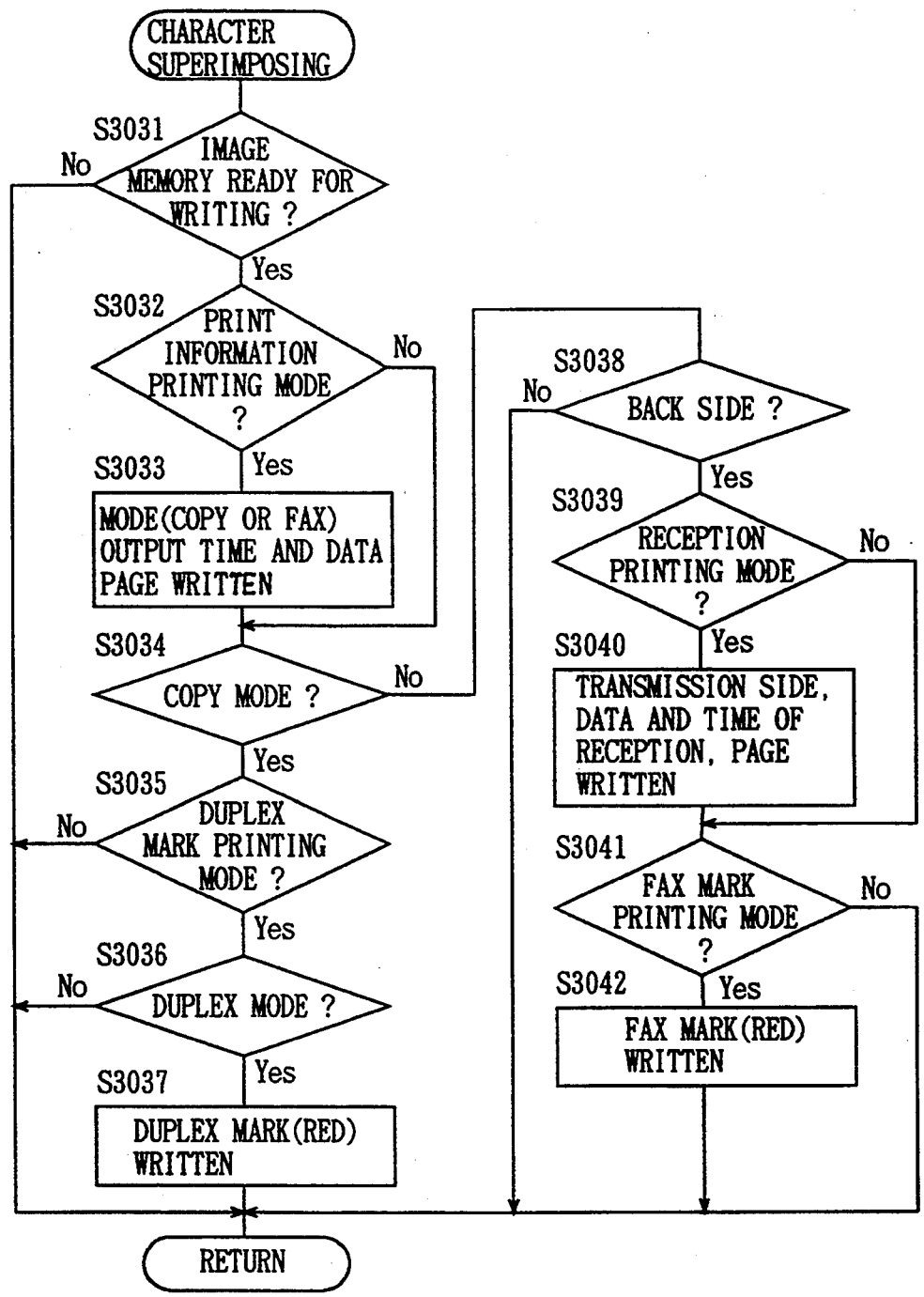
FIG. 14 is a flow chart for use in illustration of the content of a character superimposing subroutine.
Figure 15A:
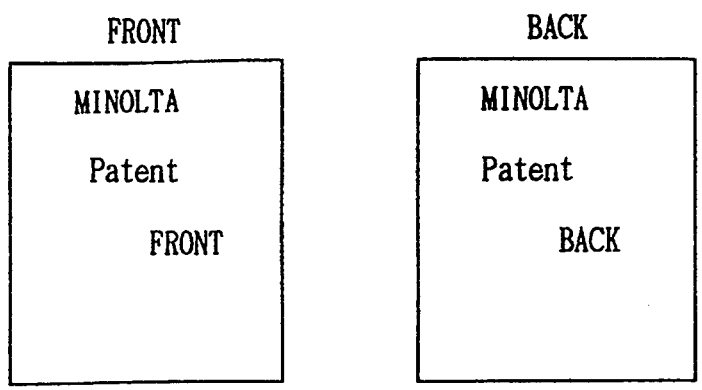
FIGS. 15(A-D) are views showing an example of a character superimposing result.
Figure 15B:
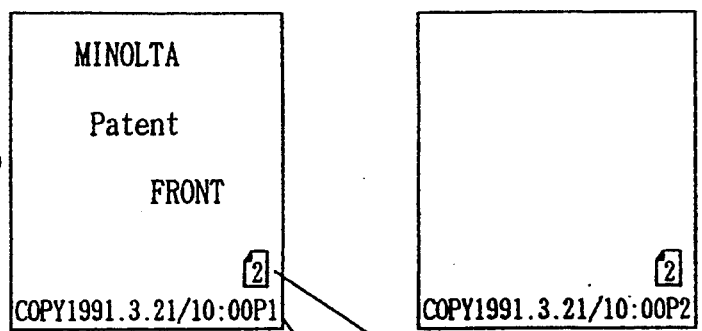
Figure 15C:
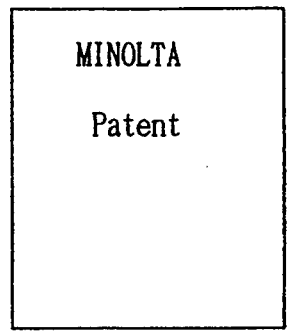
Figure 15D:
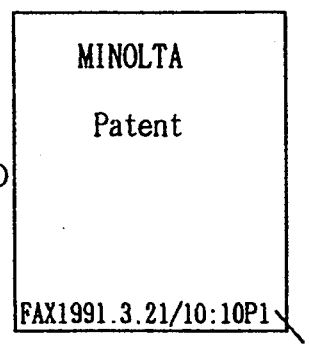

FIG. 14 illustrates the above-described character superimposing subroutine. Various information and marks are written in image memory 105 depending upon the set state of the mode setting and the operation state of the facsimile machine shown in FIG. 8 (S3031–S3042).

One example of an output result in this case is illustrated in FIG. 15. In the case of a copied original is illustrated at (A), a copy result with print information and the duplex mark printed at (B), the case of a received image at (C), and an example of a print result with the reception printing and the FAX mark printed at (D).

Referring to FIG. 15, conventionally, as in the case of a transmission side printing (stamp identifying the transmission side), a reception printing (indication of reception) should be within about the length of one line so as not to bother a received image, but in a facsimile machine according to the invention, since a reception printing is printed in a large area on the back surface of a sheet, it is easy to look at and the amount of information thereof can be increased. Being superimposed in red at the end of a paper sheet, the FAX mark can be quickly distinguished even if it overlaps the copy.

Figure 16:
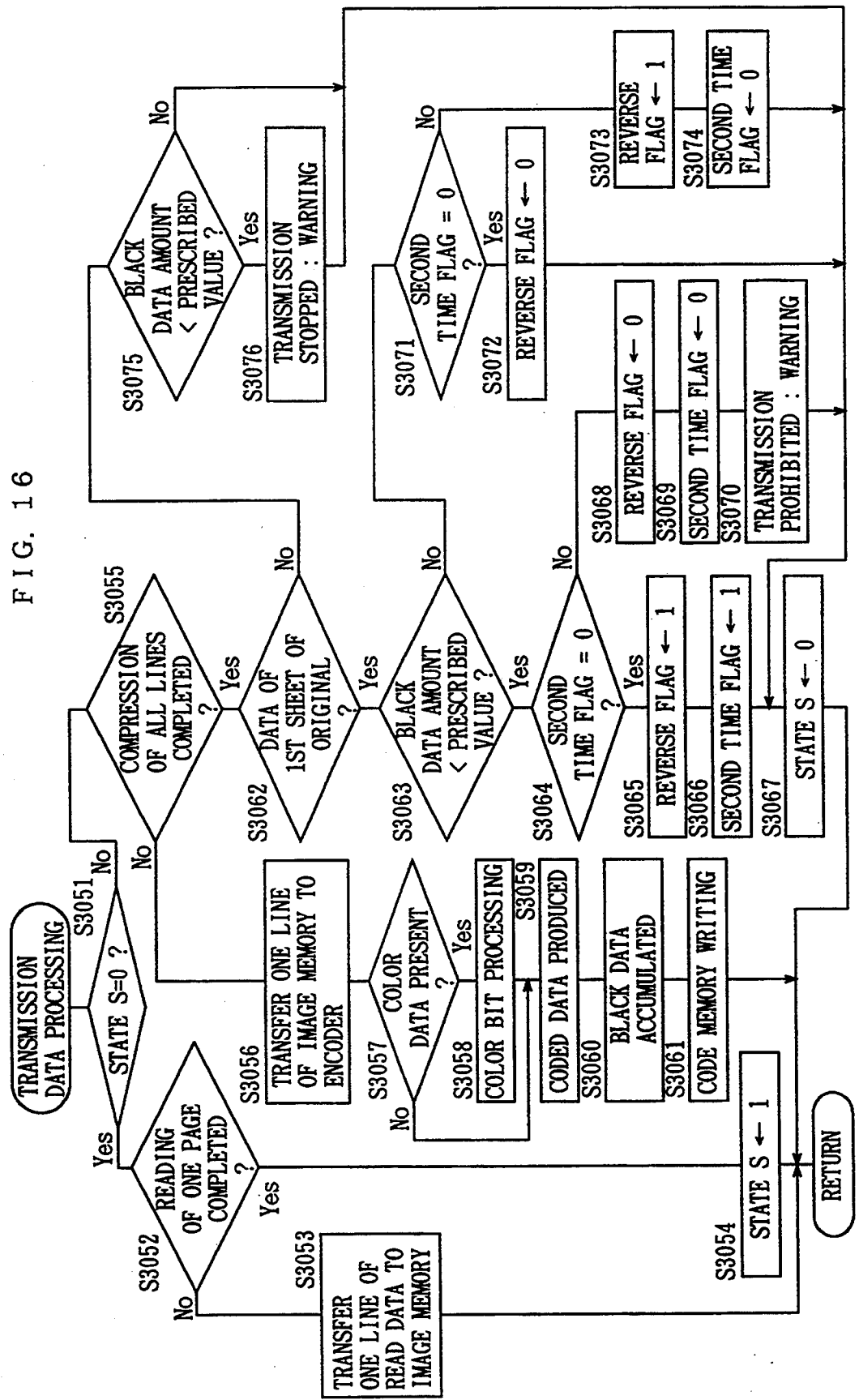
FIG. 16 is a flow chart for use in illustration of the content of a transmission data processing.

Referring to FIG. 16, the content of the transmission data processing subroutine described in S305 in FIG. 13 will be described.

When state S is 0 (set to 0 at the time of initialization), (Yes in S3051), after waiting for reading data based on the operation of scanning system 10, data is transferred to image memory 105. Upon the completion of reading for 1 page, state S is set to 1 (Yes in S3052, S3054).

The data is compressed (coded) and stored in code memory 102 (S3056–S3061). At the time, the amount of black data in the image data is counted (S3060). The count of the black data is determined by the content of coded data. One example of a coding method is illustrated in FIG. 17. This example is by the MH format of the CCITT Recommendation T.4. Herein, if, for example, black exists for consecutive two dots (followed by white), it indicates that the code is "11".

Figure 18:
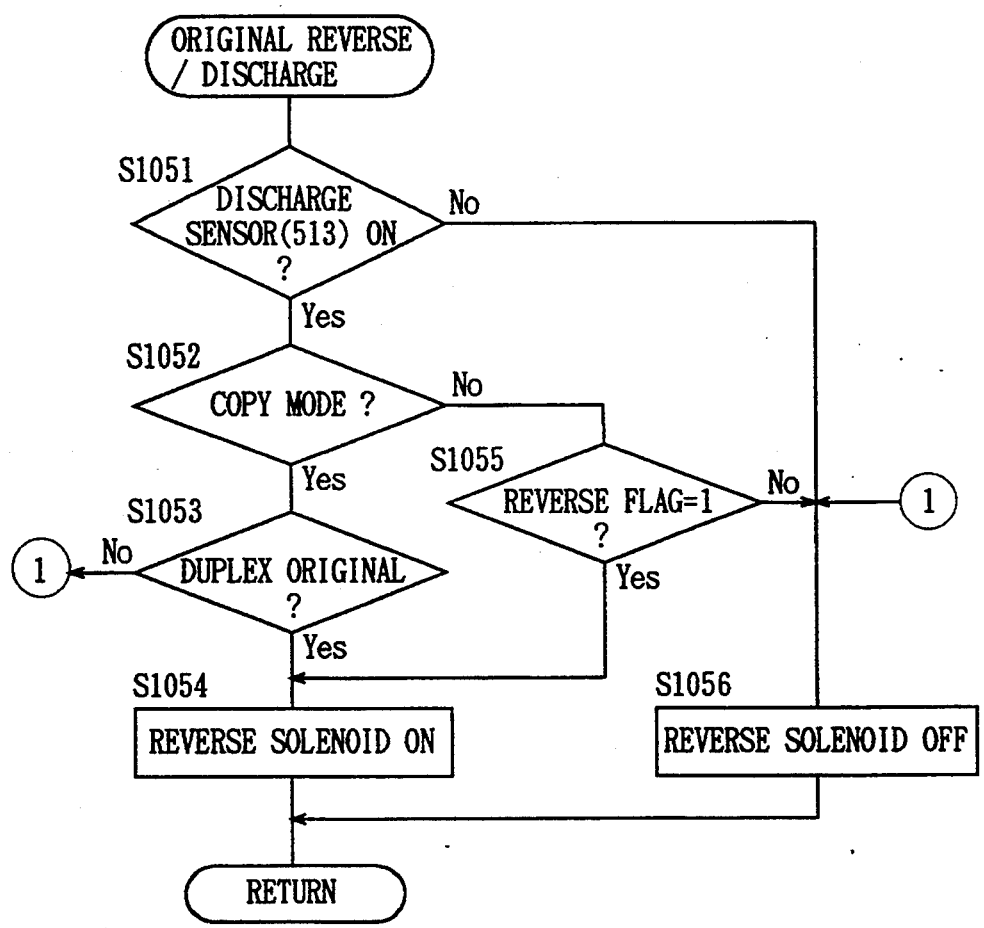
FIG. 18 is a flow chart for use in illustration of the content of an original reversal/discharge processing.

When data for one page is compressed (Yes in S3055), a reverse flag and the second time flag are decided depending upon whether or not the image is the first page of a transmitted original, whether or not the data is determined to be on the back surface of the original because of the amount of black data being smaller than a prescribed value, and whether or not the image data is the result of reversing the original and reading for the second time (second time flag =1) (S3062–S3066). If the reverse flag is set to 1, the original is reversed for reading by processing in the original conveying portion (FIG. 18).

If the both surfaces of the first page of the original are determined to be "white", or the same plane as the original plane of the first page is determined to be "white" after the second page, a calling operation is not performed and a warning is given to the operator (No in S3062, No in S3075, S3076, and S3064, S3068–S3070).

Now, received data processing, and expansion processing will be described. Referring back to FIG. 13, during receiving operation, received image data is stored in code memory 102 while counting the number of lines by a received data processing (S312). The received image data is expanded by an expansion processing subroutine (S313), and printed by a storage processing subroutine (S314).

Figure 19:
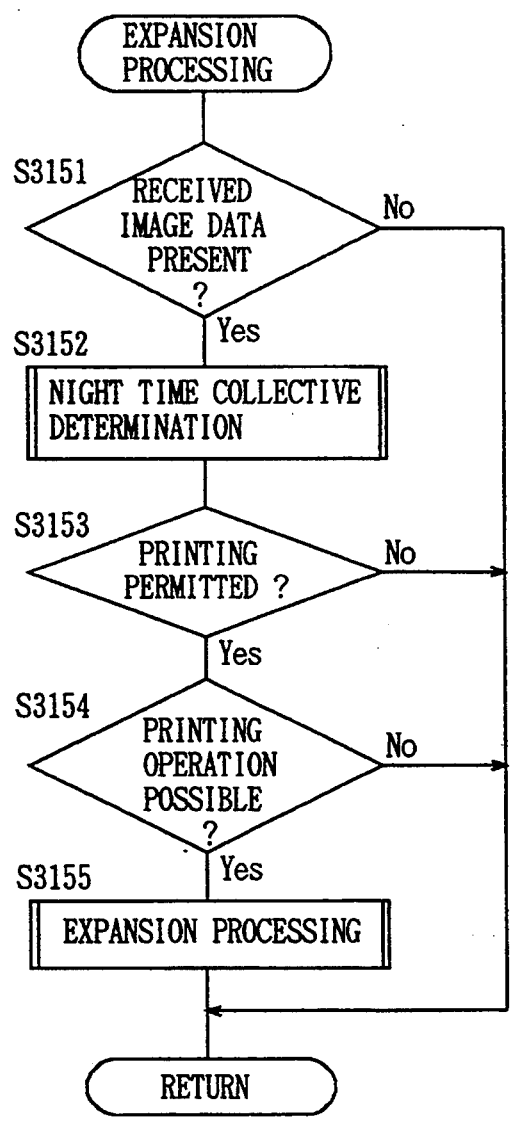
FIG. 19 is a flow chart for use in illustration of the content of an expansion processing.

The content of the expansion processing subroutine will be described in conjunction with FIG. 19. When received image data for more than one page is stored (Yes in S3151), a determination related to the night time collective processing is performed (S3152). If the result permits printing (Yes in S3153), and there is no problem in the state of image forming system 70 or the like for printing operation (Yes in S3154), the received image data is read out from code memory 102, expanded and written in image memory 105 (S3155).

Figure 20A:
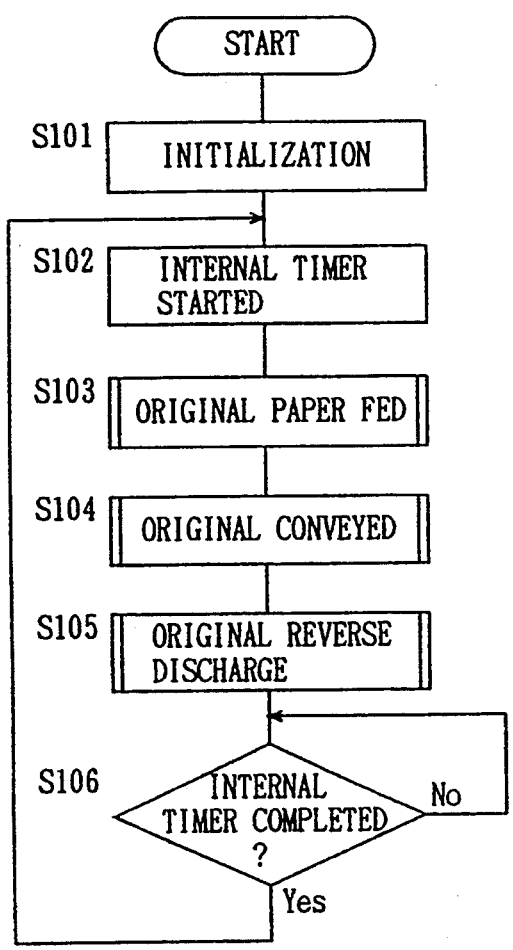
FIGS. 20(A,B) are flow charts for use in illustration of an operation conducted by a CPU 7 for original conveying control.
Figure 20B:
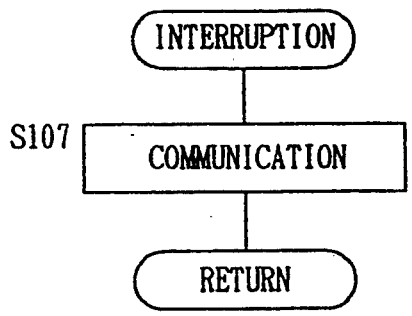

Now, original conveying control by CPU 7 will be described in conjunction with FIGS. 1 and 20.

CPU 7 controls original conveying portion 500 as follows. CPU 7 sorts original sheets, corrects the inclination of the original sheets, and feeds the original sheets for controlling conveyance thereof to as far as under the conveying belt (S101–S103). Then, original sheets under the conveying belt are positioned at a prescribed reading position, and the originals are conveyed to reverse roller 507 (S104). Original reverse/discharge operation directly discharging the original reaching reverse roller 507 or conveying the original once again to the side of conveying roller is conducted (S105). Then, communication with CPU 5 for data exchange for operation is conducted (S107).

Figure 21A:
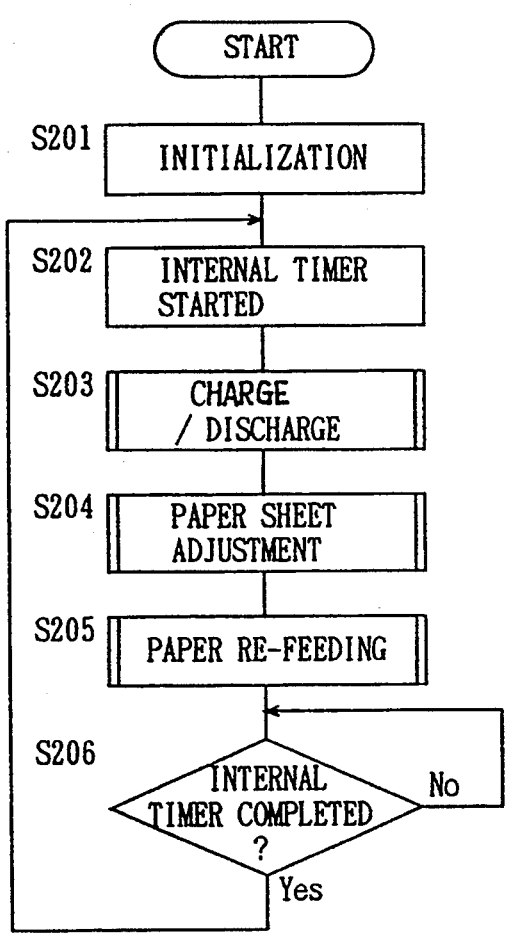
FIGS. 21(A,B) are flow charts for use in illustration of an operation by a CPU 8 for paper re-feeding control.
Figure 21B:
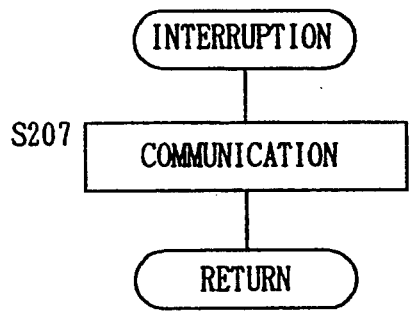

Now, paper re-feed control will be described in conjunction with FIGS. 1 and 21. CPU 8 controls paper refeed portion 600. Charge/discharge processing charging an already printed paper sheet discharged from image forming system 70 for re-feeding or directly discharging it to discharge tray 610 is conducted (S201–S203). The positions of lower and side restriction plates are changed according to the size of paper for charge, and paper adjusting processing sorting paper sheets on a sheet-by-sheet basis by the side restriction plate and a pressing plate so that there will be no problem for paper re-feeding (S204). Then, a paper re-feeding operation after the completion of the charging is conducted (S205). A communication operation with CPU 5 for data exchange for operation is conducted (S207).

The original reverse/discharge subroutine described in S105 in FIG. 20 will be described in conjunction with FIG. 1 and 18.

A discharge sensor 513 for detecting an original is provided immediately before the entrance to reverse roller 507, and the sensor detects an original conveyed by the conveying belt, and whether to once again bring the original under conveying belt 2506 or to discharge to original discharge portion 511 is controlled by switching the position of reverse/discharge switching nail 508 by turning on/off a reverse solenoid.

When the original is printed on its both sides in the copy mode (Yes in S1052, Yes in S1053) or if the reverse flag is 1 in the FAX mode (No in S1052, Yes in S1055), the reverse solenoid is turned on (S1054), and the original is reversed. The original is discharged otherwise. It is noted that if the reverse solenoid is on in the trailing edge of the original skips the discharge sensor (No in S1051) and if the reverse solenoid is turned off, the head end of the original has already reached the conveying belt and therefore there will be no problem in conveyance.

Now, the night time collective processing mode control will be described.

Figure 22:
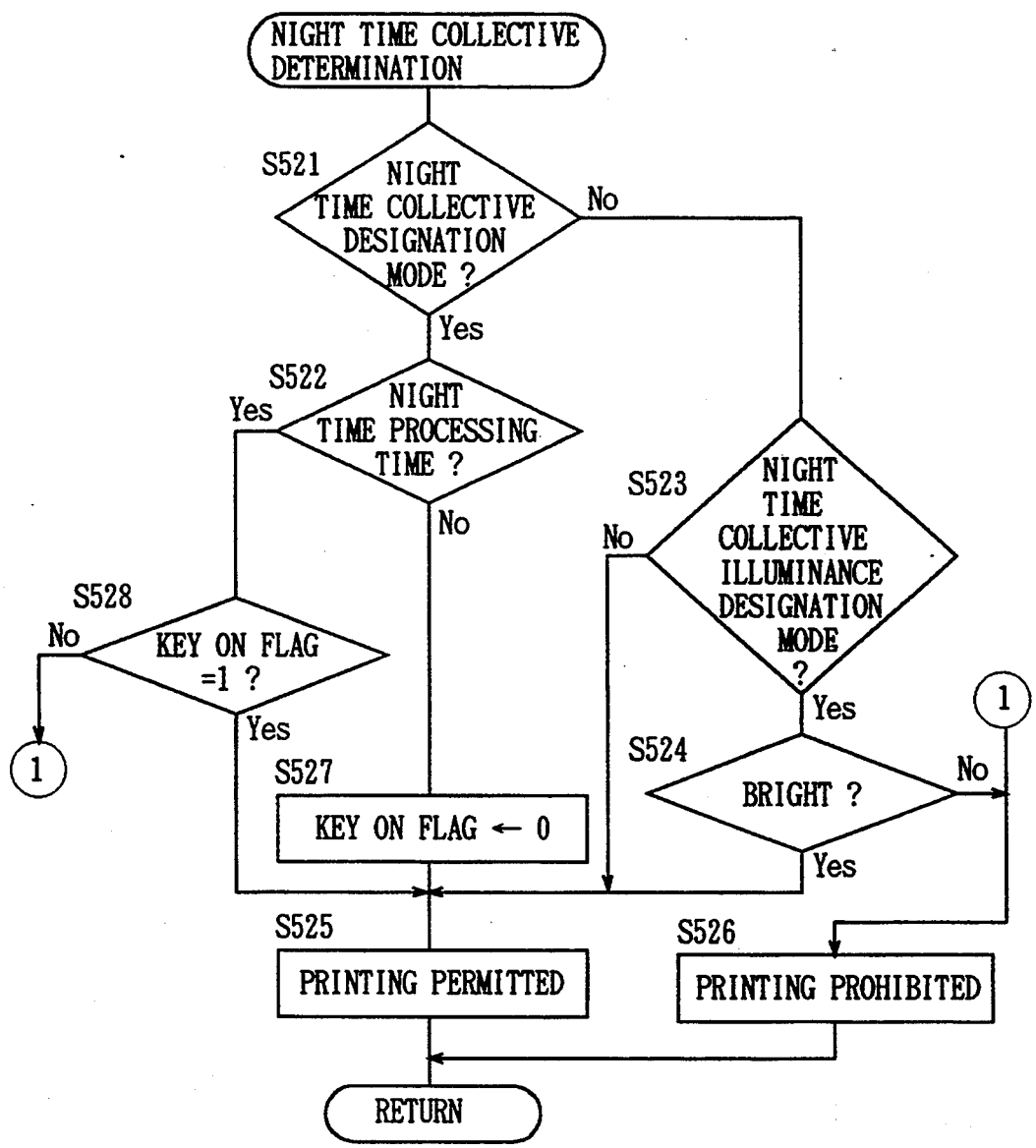
FIG. 22 is a flow chart for use in illustration of the content of a night time collective determination processing.

As illustrated in FIG. 8, the apparatus have roughly three states for the night time collective processing, in other words has time designation, illuminance designation, and cancellation. FIG. 22 illustrates the content of the night time collective determination subroutine shown at S3052 in FIG. 19.

Referring to FIG. 22, the conditions permitting printing (S525) are as follows.

(i) In neither the night time collective time designation mode nor the illumination designation mode (No in S521 and No in S523).

(ii) In the night time collective time designation mode, the present time is without the range of the night time processing designation time (Yes in S521 and No in S522).

(iii) In the night time collective illumination designation mode, an external light sensor 318 detects brightness above a prescribed value (No in S521 and Yes in S524).

(iv) In the night time collective time designation mode, the present time is without the range of the night time processing designation time, and key ON flag is 1 (Yes in S521, Yes in S522, and Yes in S528).

Printing is prohibited in the other cases (S526).

Figure 23:
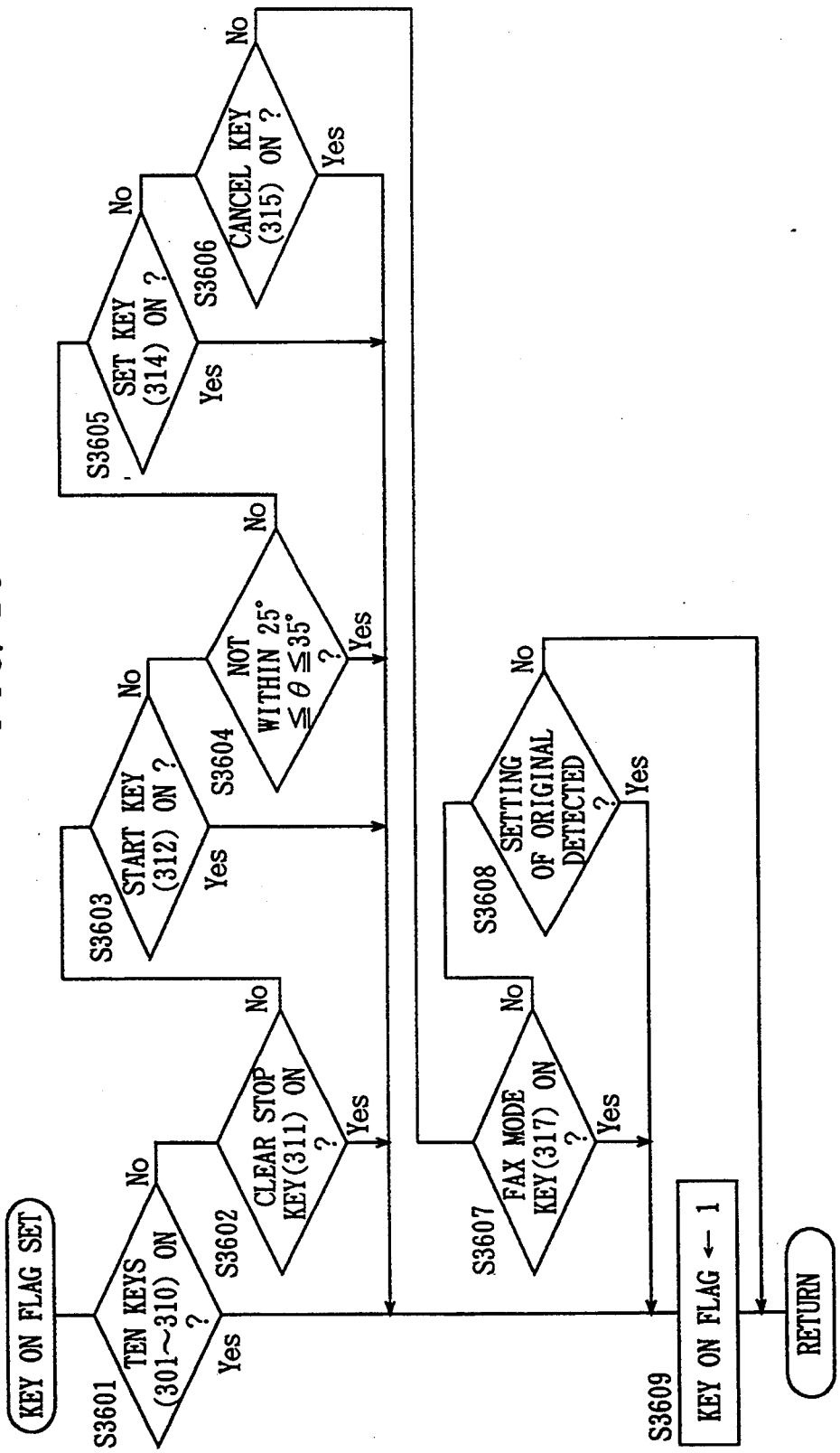
FIG. 23 is a flow chart for use in illustration of the content of a key ON flag setting processing.

Setting of the key ON flag (→1) is performed within S403 input control in FIG. 11. The content is illustrated in FIG. 23. Referring to FIG. 23, when an operation of an operation object other than copy mode key 316 is detected or an original is set, the key ON flag is set to 1 (S3608).

Figure 24:
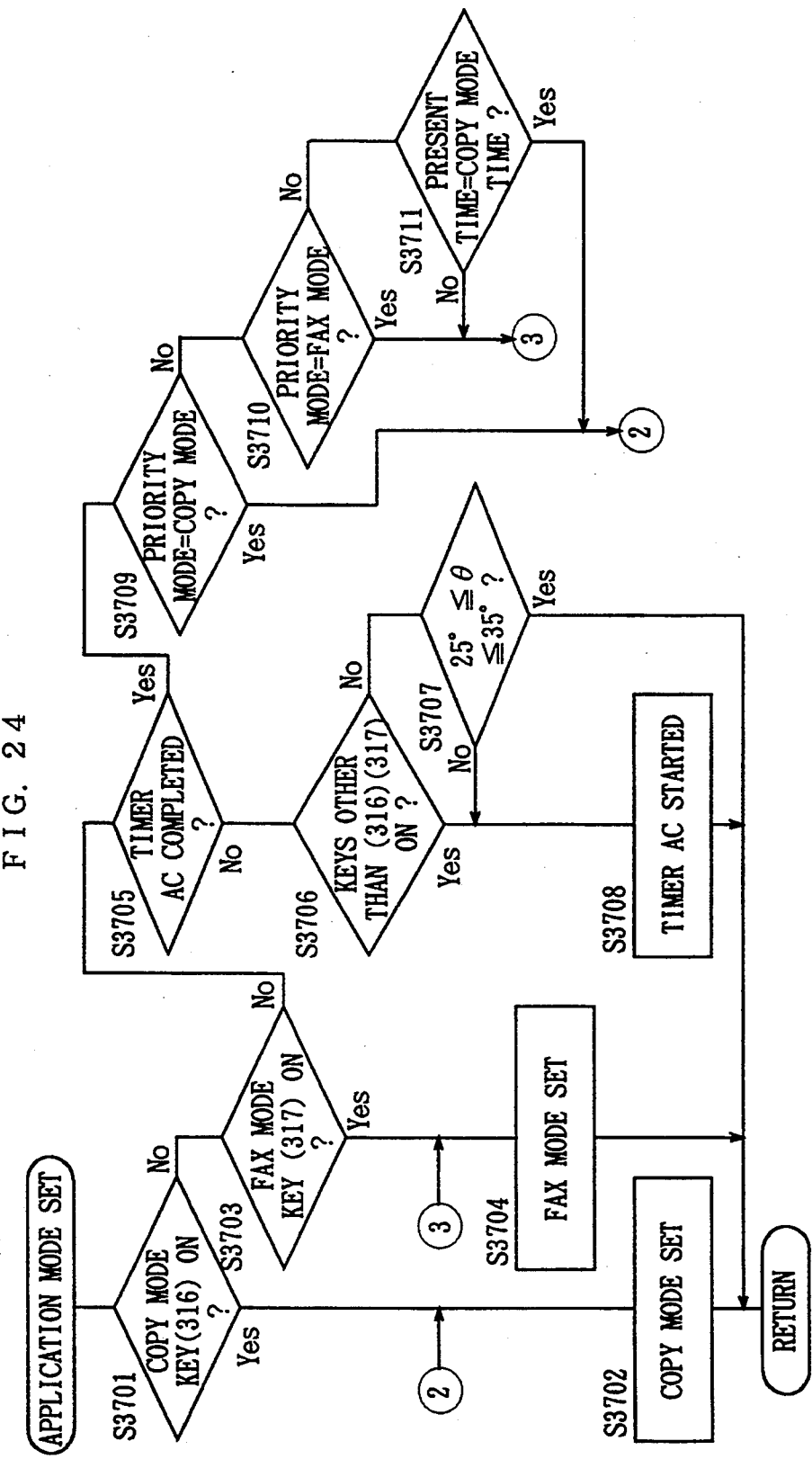
FIG. 24 is a flow chart for use in illustration of the content of an application mode setting processing.
Figure 25:
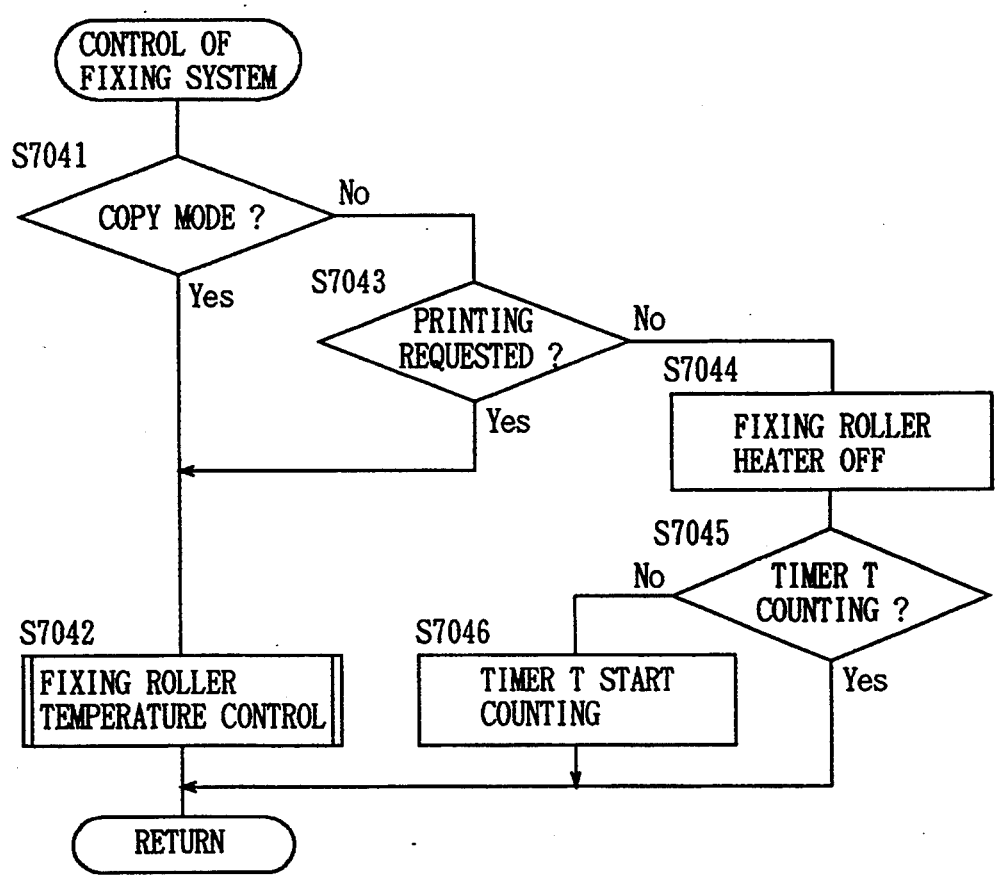
FIG. 25 is a flow chart for use in illustration of the control content of a fixing system.
Figure 26:
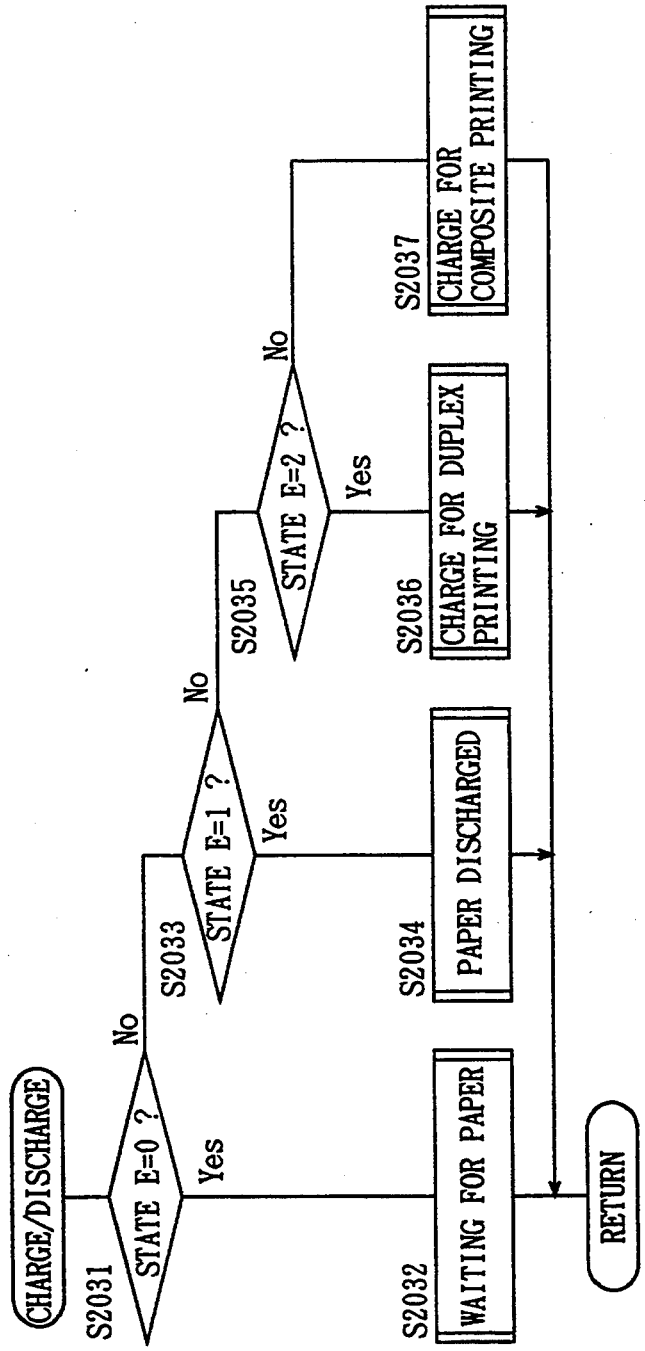
FIG. 26 is a flow chart for use in illustration of the content of a charge/discharge processing.

Referring to FIGS. 24 and 25, control in an application mode (=copy mode, FAX mode) will be described.

FIG. 24 is a flow chart for use in illustration of the content of an application mode setting routine processed within the input control routine indicated by S403 in FIG. 11. When copy mode key 316, and FAX mode key 317 are turned on, application modes corresponding to the keys are attained (S3701–S3704).

If neither key is pressed (No in S3701, No in S3703), or a timer AC is not completed (No in S3705), or a key other than the above-described two keys is pressed (Yes in S3706), joy ball 313 is moved and timer AC is started when the angle takes a value out of the range $25° \leq \theta \leq 35°$ (No in S3707) (S3708). If left as it is and timer AC counts up (Yes in S3705), the control proceeds to an application mode corresponding to a priority mode setting in FIGS. 6 and 7 (S3709–S3711). It is noted that timer AC attains its end state when the power supply is turned on.

If the priority mode is neither the copy mode nor fax mode (No in S3709 and S3710), and is the time designation mode, the copy and the fax modes are determined by the present time.

Figure 12A:
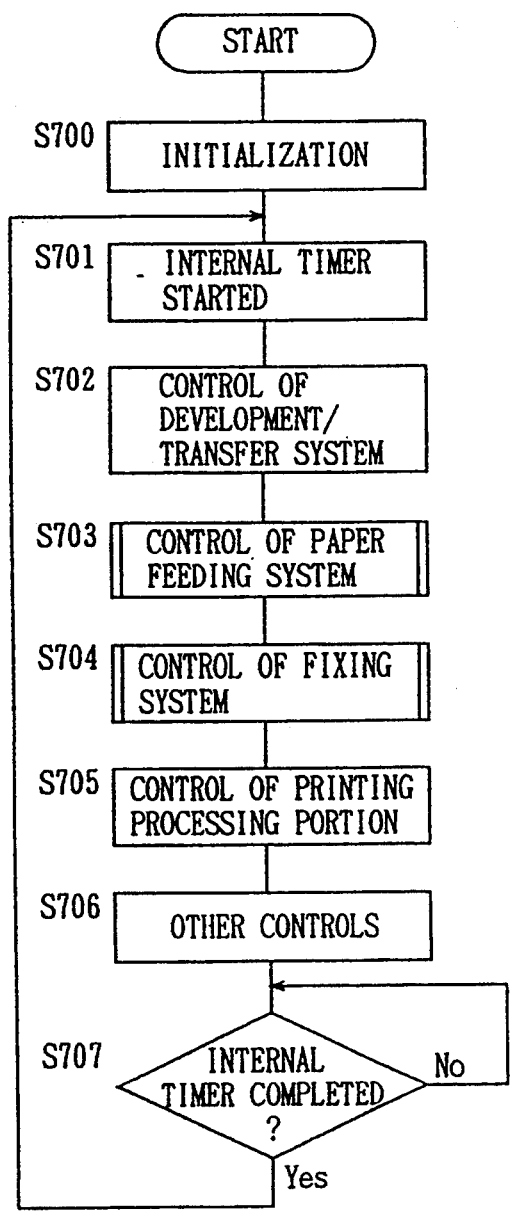
FIG. 12 is a flow chart showing an operation conducted by a CPU 4.
Figure 12B:
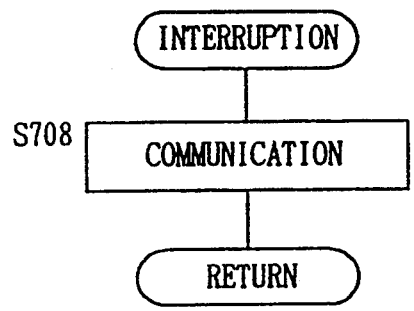

FIG. 25 is a subroutine indicating the content of the fixing system control indicated by S704 in FIG. 12. If a received image is printed in the copy mode (Yes in S7041) or in the FAX mode (No in S7041, Yes in S7043), the temperature of the fixing roller is controlled to be a fixing enable temperature (S7042) and otherwise a fixing roller heater is turned off (S7044).

Figure 27:
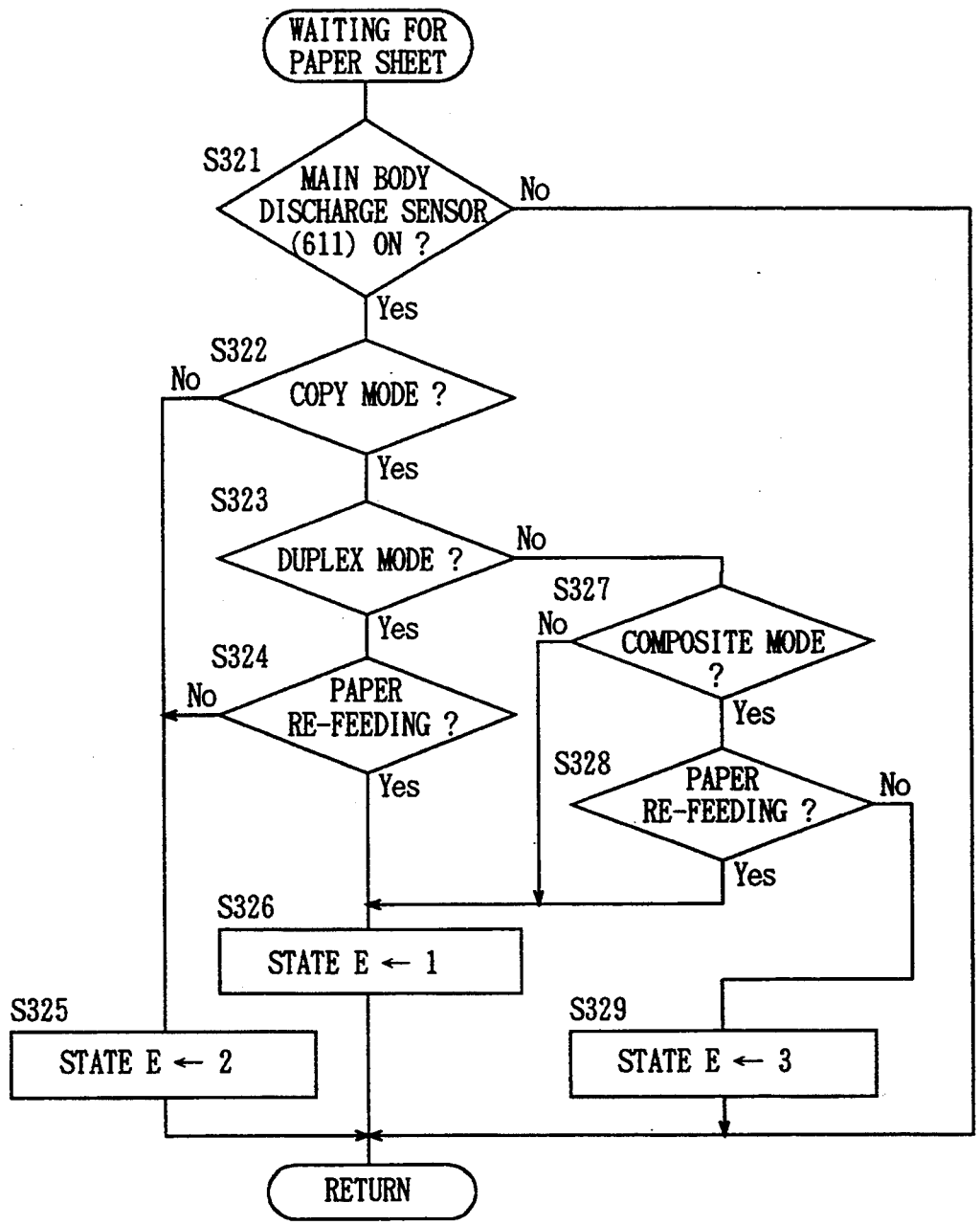
FIG. 27 is a flow chart for use in illustration of the content of a paper waiting processing.

Now, the charge/discharge sub routine indicated by S203 in FIG. 21 will be described in conjunction with FIG. 1 and FIGS. 26–30. When the power supply is turned on, state E is 0 (Yes in S2031), and paper re-feed portion 600 waits for paper sheets (S2032). The content of paper sheet waiting processing is illustrated in FIG. 27.

When a paper sheet reaches the discharge sensor 611 of the main body (Yes in S321), state E is set to any of 1–3 depending upon either the copy mode or the fax mode, duplex mode or composite mode, whether the sheet is supplied from paper re-feed portion 600 or from usual conveying system 70B (S322–S329). When state E is set to 1, a paper discharging processing is executed (S2034).

Figure 28:
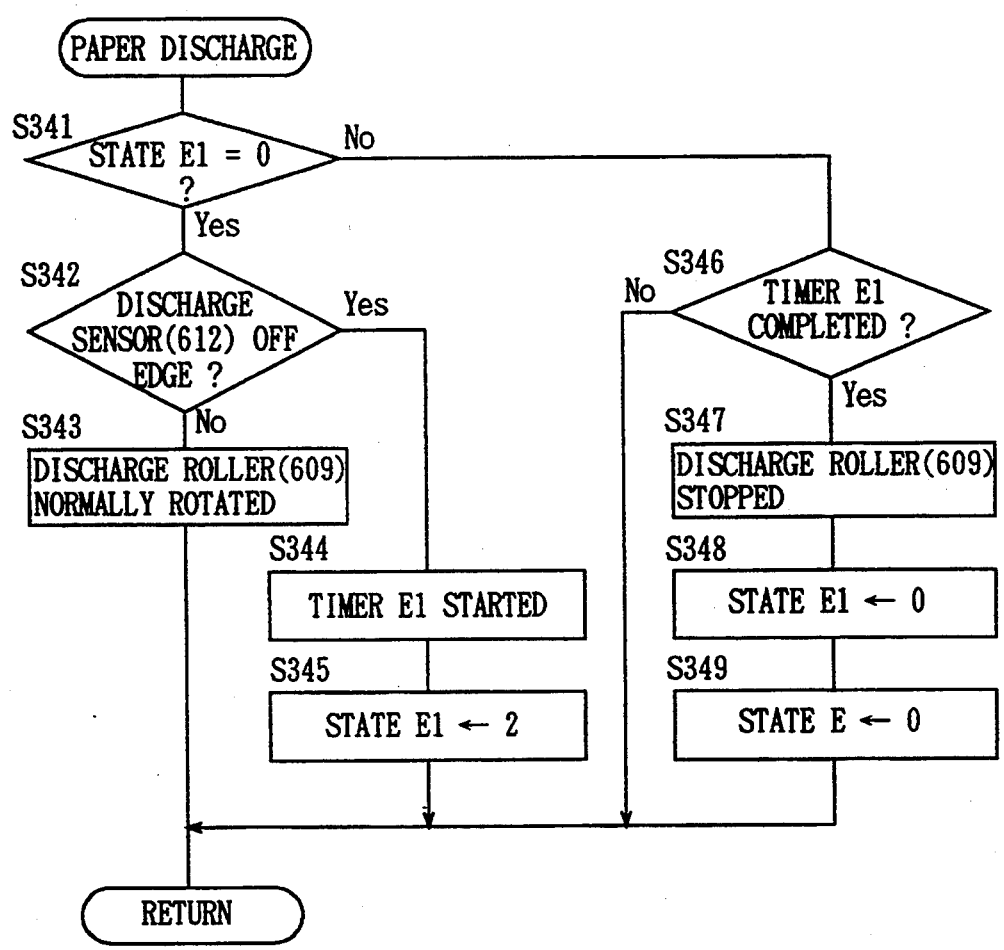
FIG. 28 is a flow chart for use in illustration of the content of a paper discharging processing.

The content is illustrated in FIG. 28. A charging solenoid (not shown) remains to be off and the paper sheet proceeds straightforward to turn on discharge sensor 612. Until the paper sheet passes and the OFF edge is detected (No in S342), discharge rollers 609 are rotated normally (in the direction of discharge) (S343). Upon detecting the OFF edge (Yes in 342), discharge rollers 609 are normally rotated for a fixed time period and stopped after finishing discharging the paper sheet to discharge tray 610, thus returning to the paper sheet waiting state (S344–S349).

If state E is 2, a charge processing for duplex printing is executed (S2036). The content thereof is illustrated in FIG. 29.

Figure 29:
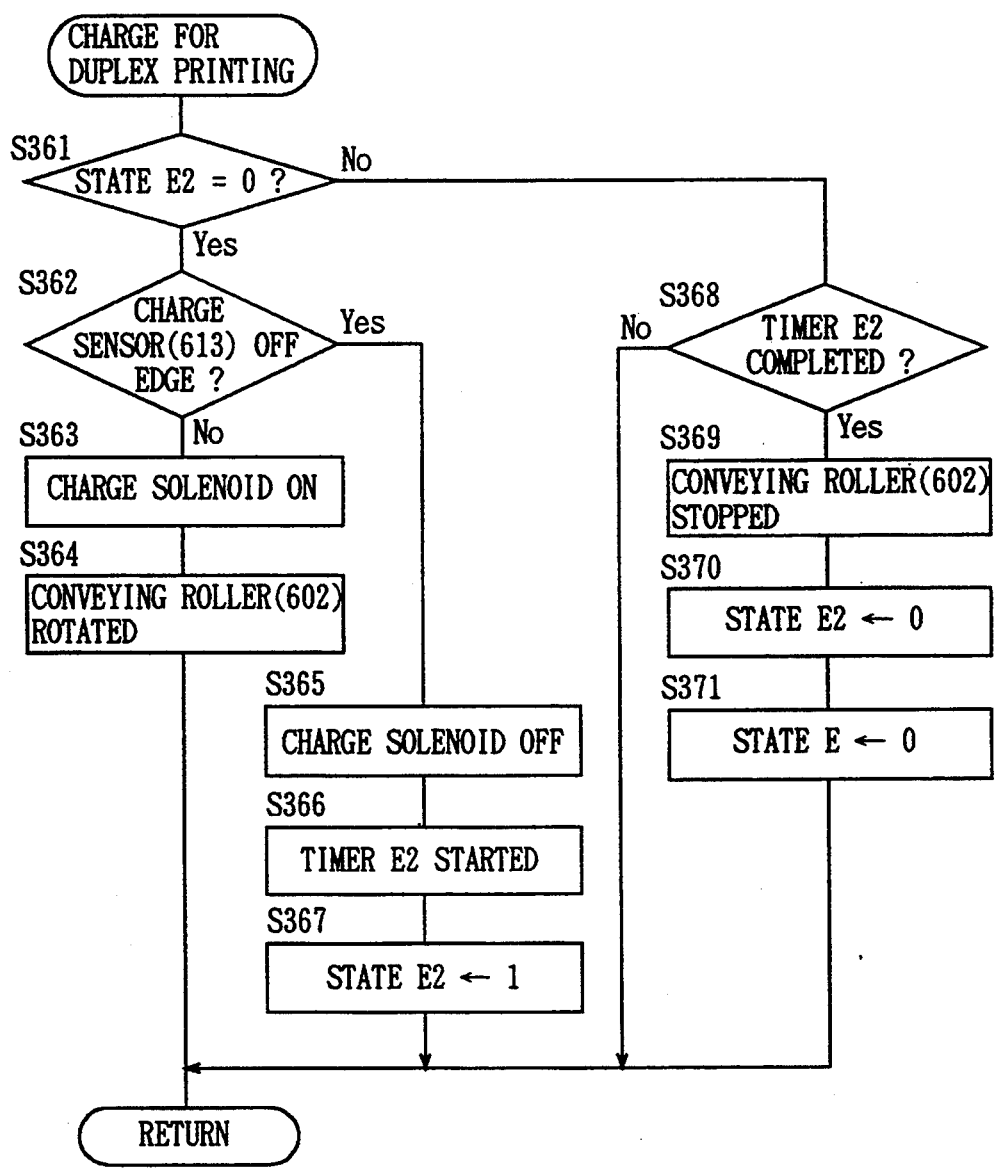
FIG. 29 is a flow chart for use in illustration of charge processing for duplex printing.
Figure 30:
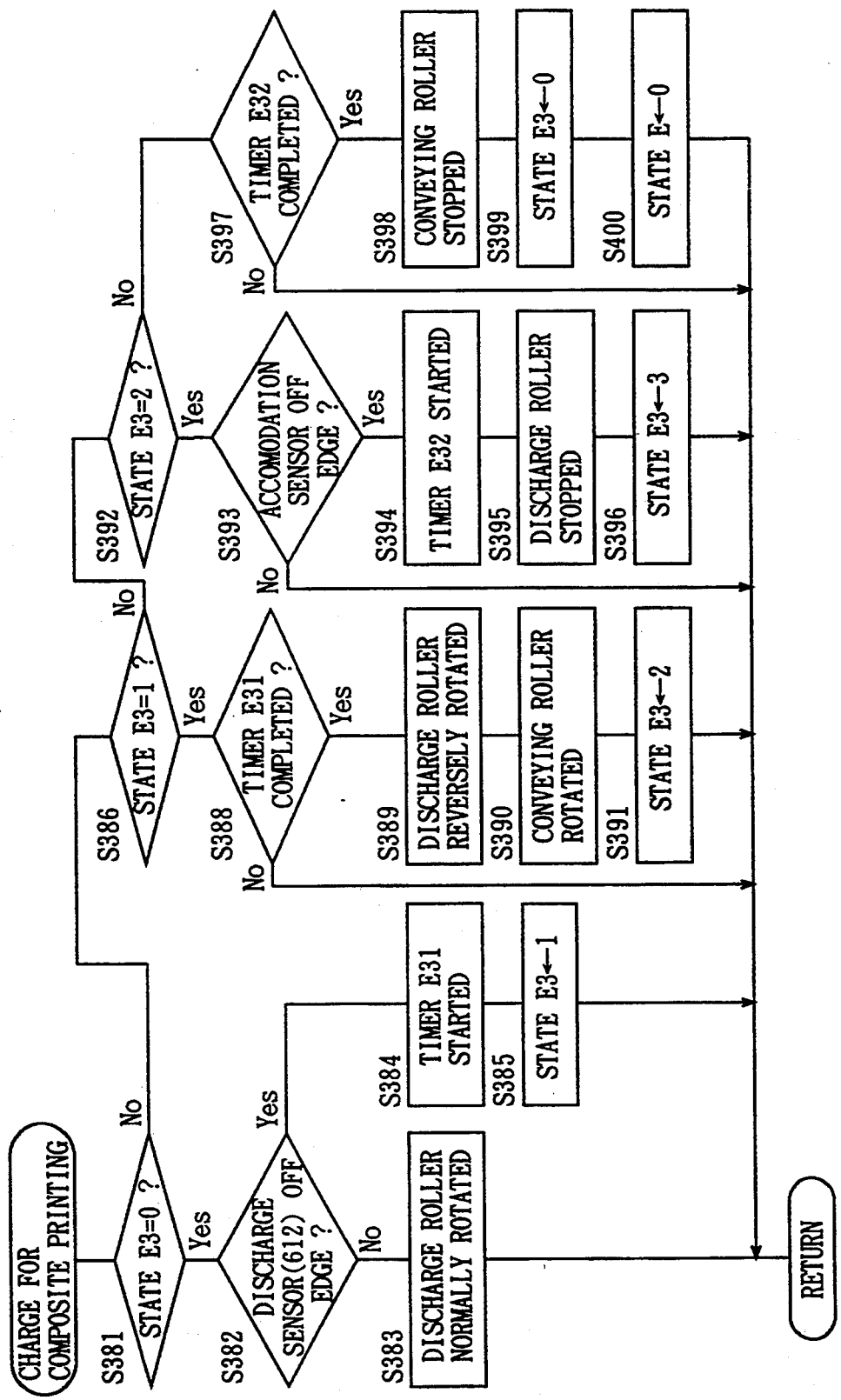
FIG. 30 is a flow chart showing the content of a charge processing for composite printing.

Referring to FIGS. 1 and 29, until charging sensor 612 detects the trailing edge of a paper sheet (No in S362), switching nail 601 is switched by turning on the charging solenoid to guide the paper sheet downwardly (S366), and conveying rollers 602 are rotated (S364). After the passage of the paper sheet (Yes in S365), the charging solenoid is turned off (S365), the conveying roller is stopped after a fixed time period, and then the roller returns to the paper sheet waiting state (S366–S371).

If state E is 3, charge processing for a composite printing is executed (S2037). The content thereof will be described in conjunction with FIG. 30. Until the trailing edge of a paper sheet is detected (No in S382), discharge rollers 609 are normally rotated (S383), and after a fixed time period detection discharge rollers 609 are reversely rotated, and conveying roller 602 is rotated (S384–S390). Thus the paper sheet is charged from its trailing edge. Then, when the paper sheet passes through charging sensor 612 and a fixed time period elapses, conveying rollers 601 are stopped and returned to the paper waiting state (S394–S400).

Figure 31:
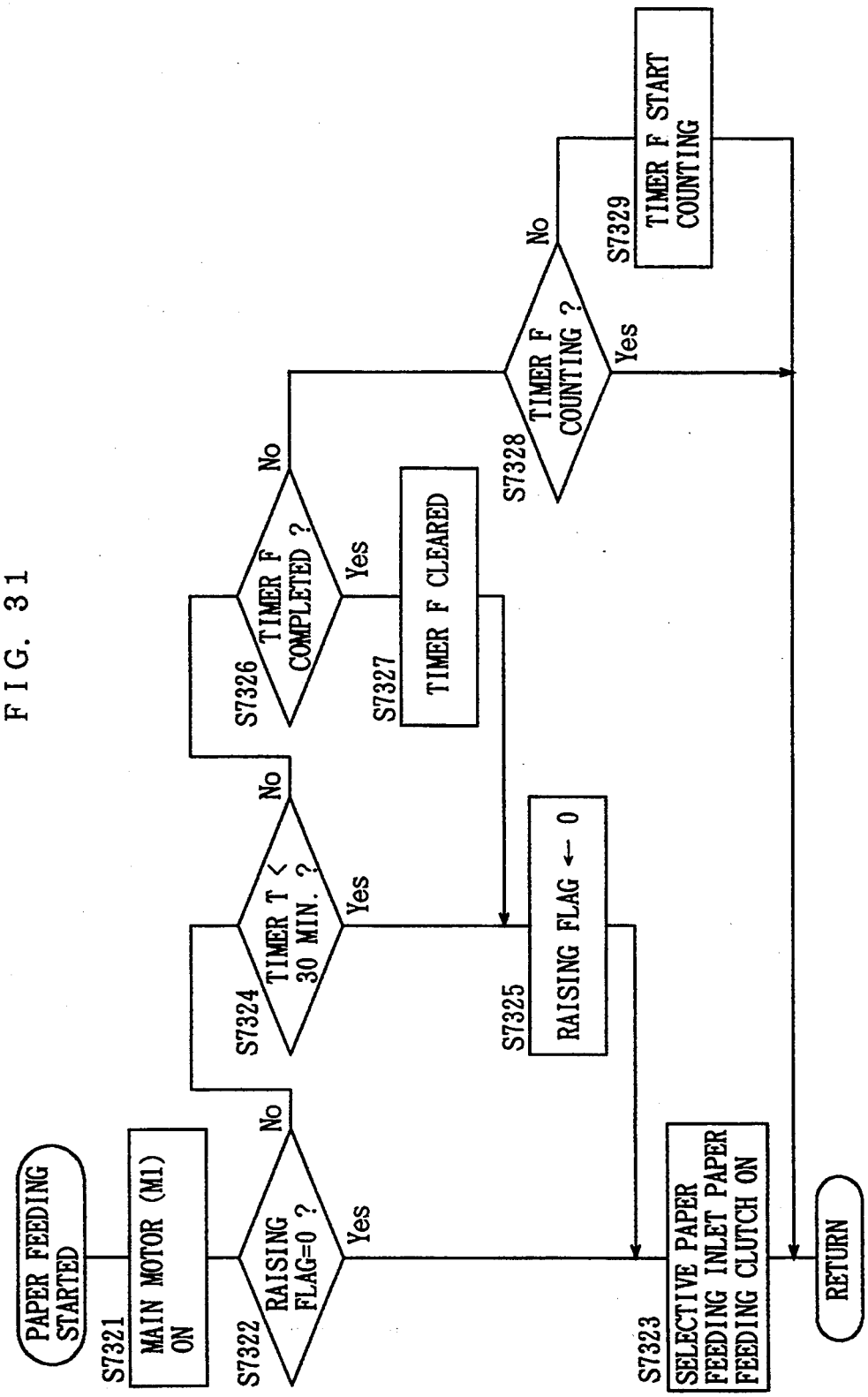
FIG. 31 is a flow chart for use in illustration of the content of a paper feeding initiation processing.

FIG. 31 is a flow chart for use in illustration of the content of a paper feeding initiation subroutine executed in the control of the paper feed system in S703 shown in FIG. 12. The routine is executed at activation of printing operation, and the control proceeds to another processing when a paper feed clutch is turned on.

A main motor is rotated (S7321). This rotates the fixing roller but a paper sheet is not fed until the paper feed clutch is turned on. Immediately after the rising, since a raising flag is set to 1 in S7427 (No in S7322), a determination of a timer T is made. When T has not reached 30 minutes (Yes in S7324), the raising flag is set to 0 (S7325), and a paper feed clutch at a selected paper feed inlet is turned on (S7323). This indicates that if the time period in which printing is prohibited is short enough, paper can be fed as usual, because the evenness of the fixing rollers are not lost.

If timer T surpasses thirty minutes (No in S7324), since a timer F is not counted up (No in S7326) and stops (No in S7328), counting of timer F is initiated (S7329).

If time F counts up (Yes in S7323), timer F is cleared (S7323), the raising flag is returned to 0 (S7325) and the paper feed clutch at the selected paper feed inlet is turned on (S7323). More specifically, if the time period in which printing is not permitted surpasses a certain time period, the paper feeding operation is delayed by the amount indicated by timer F.

As described above, after the completion of a warming up operation, at the time of starting printing, timing for paper feeding is delayed to the rotation of the fixing rollers than usual, and therefore the evenness of the temperature of the fixing rollers can be kept, so that a stable image can be provided as a result.

It is noted that in this embodiment, although the night time collective processing mode performing memory reception during the night time when the operator is not present has been described, a processing similar to the night time collective processing mode may be executed during holidays when the operator is not around as in the case of the night time. More specifically, the facsimile machine may be provided with a calendar function for determining what day of the week it is and holidays, or with holiday setting means enabling the operator to set holidays, and during the holidays a holiday collective processing performing memory reception may be performed. Even in the holiday collective processing mode, storage data stored in the storage means is output once operation keys are operated or setting of an original is detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile machine, comprising:
   reading means for reading an image of an original and outputting image data;
   reception means for receiving image data transmitted through a communication line;
   image forming means for forming an image on a paper sheet based on the image data from said reading means or said reception means;
   discharge means capable of discharging said paper sheet in a first state in which a surface on which said image is formed faces upward, or in a second state in which the surface on which said image is formed faces downward;
   paper sheet holding means for holding the paper sheet discharged by said discharge means; and
   control means for controlling said discharge means to discharge a paper sheet having an image formed based on image data from said reading means onto said paper sheet holding means in one of said first and second states and to discharge a paper sheet having an image formed based on image data from said reception means onto said paper sheet holding means in the other of said first and second states.

2. A facsimile machine as recited in claim 1, wherein said control means controls said discharge means to discharge the paper sheet having the image formed based on the image data from said reading means in said first state and the paper sheet having the image formed based on the image data from the reception means in said second state.

3. A facsimile machine, comprising:
   reading means for reading an image of an original and outputting image data;
   reception means for receiving image data transmitted through a communication line;
   image forming means for forming an image on a paper sheet based on the image data from said reading means or said reception means;
   identifying means for identifying whether the image formed by said image forming means is based on the image data from said reading means or the image data from said reception means; and
   printing means for printing a result of identification by said identifying means on a paper sheet having said image formed thereon, said printed result of identification identifying whether the image on the paper sheet is based on the image data from said read in means or on the image data from said reception means.

4. A facsimile machine as recited in claim 3, wherein said printing means attaches a mark on an end of said paper sheet, when said identification means identifies the image to be based on the image data from said reception means.

5. A facsimile machine as recited in claim 4, wherein said image forming means being capable of forming an image in a plurality of colors, and said printing means attaches a mark in a color different from the colors of the image formed based on the image data.

6. A facsimile machine as recited in claim 3, wherein said printing means prints only when the image is identified to be the image data from said reading means.

7. A facsimile machine, comprising:
reception means for receiving transmitted image data;
image forming means capable of forming images on both sides of a paper sheet; and
control means for controlling said image forming means to form an image on one side of a paper sheet based on said image data from said reception means and to form reception information relating to said transmitted image on the other side of the paper sheet.

8. A facsimile machine as recited in claim 7, wherein said reception information includes information on a transmitting party.

9. A facsimile machine as recited in claim 7, wherein said reception information includes information related to time of reception.

10. A facsimile machine, comprising:
a plurality of keys for input for operation;
an original plate for setting an original to be transmitted;
reception means for receiving image data transmitted through a communication line;
detection means for detecting operation of said plurality of keys or setting of an original to said original plate;
storage means for storing image data received by said reception means;
image forming means for forming an image on a paper sheet, based on image data from said reception means or image data stored at said storage means;
time setting means for setting starting time and ending time for a prescribed operation;
first control means for controlling said image forming means to permit said received image data to be stored at said storage means during a time period from said starting time to ending time, and to form an image based on the image data stored at said storage means at said ending time; and
second control means for controlling said image forming means to form an image based on the image data stored at said storage means, in response to a detection result from said detection means, during the time period from said starting time to ending time.

11. A facsimile machine, comprising:
reception means for receiving transmitted image data;
storage means for storing the image data received by said reception means;
image forming means for forming an image on a paper sheet based on image data from said reception means or image data stored at said storage means;
calendar means for determining a holiday based on what day of the week it is or date; and
control means for controlling said image forming means to permit said storage means to store said received image data without forming an image if said calendar means determines that the day in which said machine is used is holiday, and to form an image based on the image data stored at said storage means in a day other than holiday.

12. A facsimile machine as recited in claim 11, further comprising:
a plurality of keys for input for operation;
an original plate for setting an original to be transmitted;
detection means for detecting operation of said plurality of keys or setting of an original to said original plate; and
second control means for controlling said image forming means to form an image based on the image data stored at said storage means in response to a detection result from said detection means if said calendar means determines that the day in which the facsimile machine is used is holiday.

13. A facsimile machine as recited in claim 12, wherein
said calendar means can set an arbitrary date as holiday.

14. A facsimile machine, comprising:
reception means for receiving image data transmitted through a communication line;
image forming means for forming an image on a paper sheet utilizing an electrophotographing process, including fixing means for fixing toner images on the paper sheet;
mode setting means for setting a first mode in which said image data is stored in storage means and a second mode in which said image forming means forms an image based on image data; and
control means for controlling that said fixing means is not activated when said first mode is set by said mode setting means and said fixing means is activated when said second mode is set by said mode setting means.

15. A facsimile machine as recited in claim 14 further comprising priority mode selection means for determining which mode has a priority.

16. A facsimile machine as recited in claim 14 further comprising reading means for reading the image of an original and outputting the image data,
said reading means forming an image based on the image data from said reading means when the machine is set to said printer mode.

17. A facsimile machine, comprising:
reception means for receiving transmitted image data;
storage means for storing the image data received by said reception means;
image forming means for forming an image on a paper sheet based on the image data from said reception means or on the image data stored at said storage means;
detection means for detecting the brightness of the surroundings of said facsimile machine; and
control means for controlling said image forming means to permit said storage means to store said received image data, if the brightness detected by said detection means is determined to be lower than a prescribed brightness, and to form an image based on the image data stored at said storage means if the brightness is determined to be higher than the prescribed brightness.

* * * * *

UNITED STATES PATENT AND TRADEMARK OFFICE
CERTIFICATE OF CORRECTION

PATENT NO. : 5,410,419
DATED : April 25, 1995
INVENTOR(S) : Hideo Muramatsu, et al.

It is certified that error appears in the above-identified patent and that said Letters Patent is hereby corrected as shown below:

In col. 6, line 11, change "199" to --1-99--.

In col. 8, line 25, before "transfer" insert --→--.

In col. 9, line 6, delete "]".

In col. 9, line 11, change "1.05" to --105--.

In col. 11, line 39, change "2506" to --506--.

In col. 15, line 1 (Claim 3, line 18), change "read in" to --reading--.

In col. 15, line 25 (Claim 7, line 9), after "image" insert --data--.

Signed and Sealed this

Thirty-first Day of October 1995

Attest:

BRUCE LEHMAN

Attesting Officer

Commissioner of Patents and Trademarks